US006453299B1

(12) United States Patent
Wendkos

(10) Patent No.: US 6,453,299 B1
(45) Date of Patent: Sep. 17, 2002

(54) METHOD FOR CUSTOMIZING QUERIES

(75) Inventor: Brad Wendkos, St. Petersburg, FL (US)

(73) Assignee: Aspen Marketing, Inc., Los Angeles, CA (US)

( * ) Notice: Subject to any disclaimer, the term of this patent is extended or adjusted under 35 U.S.C. 154(b) by 0 days.

(21) Appl. No.: 09/237,864

(22) Filed: Jan. 27, 1999

Related U.S. Application Data

(62) Division of application No. 08/768,461, filed on Dec. 18, 1996, now Pat. No. 5,983,169.
(60) Provisional application No. 60/008,873, filed on Dec. 19, 1995.

(51) Int. Cl.$^7$ .............................................. G06F 17/60
(52) U.S. Cl. ................................ 705/14; 705/1; 705/7; 705/10
(58) Field of Search ............................ 705/1, 14, 7, 10

(56) References Cited

U.S. PATENT DOCUMENTS

| 3,962,599 A | 6/1976 | Say ............................ 313/449 |
| 4,349,767 A | 9/1982 | Muramoto et al. ......... 313/449 |
| 4,366,415 A | 12/1982 | Takenaka et al. ........... 313/457 |
| 4,788,716 A | * 11/1988 | Zebe ............................ 379/92 |

(List continued on next page.)

FOREIGN PATENT DOCUMENTS

| CA | 2142691 A1 | 5/1995 | |
| EP | 0 251 137 A2 | 1/1988 | ............ H01C/7/00 |
| JP | 57-118351 | 7/1982 | ............ H01J/29/48 |
| WO | WO/95/12175 | 5/1995 | |
| WO | WO/96/36926 | 11/1996 | |

OTHER PUBLICATIONS

Creighton, Heidi; Network World Fusion Partners with Focalink Communications . . . ; PR Newswire, Jun. 3, 1996.*
Fink, Arlene and Kosecoff, Jacqueline; How to Conduct Srveys, SAGE Publications, pp. 10 and 11, 1998.*
Dillman, Don A., Mail and Telephone Surveys, Willey–Interscience Publcation, pp. xiv–xvi from Contents, See Ch.7, 1978.*
Federal Register, vol. 65, No. 120, pp. 38510–38516, 1998.*
Bort, J., Dialog record 01939202 of InfoWorld, "Tapping into Telephony", vol. 18, No. 21, pp. 1–3, May 20, 1996.

*Primary Examiner*—Vincent Millin
*Assistant Examiner*—Pedro R. Kanof
(74) *Attorney, Agent, or Firm*—Irah H. Donner; Luke J. Yeh; Hale and Dorr LLP

(57) ABSTRACT

A computer implemented system awards promotional incentives. A participant in the awards system calls or connects to an interactive platform for registering and/or redeeming credits preferably described in uniquely identified certificates. In a telephone environment, the interactive platform is connected to a toll free telephone number where a participant's call is handled by a computer controlled voice response unit. In a computer network environment, a computer user connects to the interactive platform over the network. The participant receives awards credits based on the unique identification of certificates. Award credits for a participant are accumulated in a stored record associated with the participant until redeemed. Award credits can also be acquired as an instant winner based on a random or algorithmic selection of callers to receive such credits. Awards include electronic prizes such as free long distance telephone time, electronic cash and/or service credits. Connection to the interactive platform may occur during execution of an application program such as an electronic game or electronic shopping.

73 Claims, 29 Drawing Sheets

U.S. PATENT DOCUMENTS

| | | | | |
|---|---|---|---|---|
| 4,908,761 A | | 3/1990 | Tai | |
| 5,011,005 A | | 4/1991 | Boyd et al. | 206/0.81 |
| 5,022,067 A | * | 6/1991 | Hughes | 379/95 |
| 5,025,372 A | | 6/1991 | Burton | 364/406 |
| 5,128,752 A | | 7/1992 | Von Kohom | |
| 5,269,521 A | | 12/1993 | Rossides | |
| 5,287,268 A | | 2/1994 | McCarthy | |
| 5,297,026 A | | 3/1994 | Hoffman | 364/408 |
| 5,327,508 A | | 7/1994 | Deaton et al. | |
| 5,353,218 A | | 10/1994 | De Lapa et al. | |
| 5,359,508 A | * | 10/1994 | Rossides | 364/401 |
| 5,362,051 A | | 11/1994 | Swafford, Jr. et al. | 273/138 |
| 5,450,938 A | | 9/1995 | Rademacher | |
| 5,483,444 A | | 1/1996 | Heintzeman et al. | 364/401 |
| 5,513,117 A | * | 4/1996 | Small | 364/479 |
| 5,515,270 A | * | 5/1996 | Weinblatt | 364/405 |
| 5,518,253 A | * | 5/1996 | Pocock et al. | 273/439 |
| 5,537,314 A | * | 7/1996 | Kanter | 364/406 |
| 5,550,907 A | * | 8/1996 | Carlsen | 379/207 |
| 5,675,780 A | | 10/1997 | Plant-Mason et al. | 395/606 |
| 5,687,322 A | * | 11/1997 | Deaton et al. | 395/214 |
| 5,706,339 A | * | 1/1998 | Eisdorfer et al. | 379/211 |
| 5,729,693 A | | 3/1998 | Holda-Fleck | 395/214 |
| 5,857,175 A | * | 1/1999 | Day et al. | 705/14 |
| 5,888,427 A | * | 3/1999 | Khosla | 705/14 |
| 5,924,080 A | * | 7/1999 | Johnson | 705/26 |
| 5,956,693 A | * | 9/1999 | Geerlings | 705/14 |
| 5,970,469 A | * | 10/1999 | Scroggie et al. | 705/14 |
| 6,041,311 A | * | 3/2000 | Chislenko et al. | 705/27 |

* cited by examiner

| CREDITS REQUIRED | AWARD CODE | AWARD .VOX | Q/A REQUIRED |
|---|---|---|---|
| 0010 | 01 | 15 MIN.VOX | 0 |
| 0030 | 02 | 60 MIN.VOX | 0 |
| 0050 | 03 | 120 MIN.VOX | 0 |
| 0100 | 04 | CD.VOX | 1 |
| 0250 | 05 | TV.VOX | 1 |
| 0750 | 06 | AIR.VOX | 1 |

500 510 520 530 ← 540

(AWARD LEVEL TABLE)

Figure 5

| INTERACTION OR CALL # | MODULES CALL FLOW |
|---|---|
| #1 (FIRST CALL) | GP, M1, CN, M2, SB, M3, GB |
| #2 (SECOND CALL) | GP, CN, SB, M4, IW, GB |
| #3 (THIRD CALL) | GP, CN, SB, P1, GB |
| #4 ETC. | GP. CN, SB, M5, VC, GB |
| #5 | GP, CN, SB, M6, GB |

600 610 ← 620

(CALL FLOW TABLE)

Figure 6

(FRONT)

(REVERSE)

(INSIDE LEFT)

(INSIDE RIGHT)

METHOD FOR CUSTOMIZING QUERIES

RELATED APPLICATIONS

This application is a Divisional Application of U.S. Application Ser. No. 08/768,461, filed Dec. 18, 1996, which has issued as U.S. Pat. No. 5,983,169, which in turn claims priority to U.S. Provisional Application No.60/008,873, filed Dec. 19, 1995, the entire disclosures of both of which are herein incorporated by reference. This application is related to pending U.S. divisional application Ser. Nos. 09/237,879; 09/237,865; 09/237,866; 09/237,863; 09/238,053; and 09/238,054 all filed Jan. 27, 1999, to Wendkos, and all of which are incorporated herein by reference.

TECHNICAL FIELD

This invention relates to the field of communication systems and to the field of computer systems and more particularly to a computer implemented interactive promotional system which utilizes a communications system for tracking and awarding promotional incentives.

BACKGROUND OF THE INVENTION

A number of organizations such as credit card firms, automobile manufacturers, rental car companies, department stores, long distance telephone organizations, financial institutions and others have offered a number of different programs for promoting purchases of goods or services. These have included discount offers for certain catalog items, based on volume of activity in an account. Other promotional schemes have involved discounts on goods or services offered by others. For example, discount coupons have been offered for airline tickets based on a minimum level of investment at a bank or savings and loan. Similarly, holders of bank cards have been offered deeply discounted or free air travel based on a certain level of activity using a general purpose charge card or have been credited with frequent flyer miles based on activity in a charge card account.

U.S. Pat. No. 5,025,372, issued on Jun. 18, 1991 to Burton et al. discusses the problems associated with administering promotional or incentive marketing programs that utilize an award of merchandise. In one form of promotion, the incentive company has its own warehouse facilities to store the merchandise. There are a number of disadvantages of this approach. The incentive company has to prepare catalogs, stock and distribute them. An inventory of merchandise ties up the incentive company's money. If the incentive company underestimates or overestimates the demand for a particular item of merchandise, either excessive delay will create customer dissatisfaction or the incentive company must suffer the loss associated with merchandise which does not move. The approach proposed by Burton et al. to overcoming these problems is to implement an incentive award program using computer systems and to issue, instead of merchandise, credit instruments which enable the participant in the program to select a reward of their own choosing.

U.S. Pat. No. 5,297,026, issued Mar. 22, 1994 to Frank Kaufman discloses a computerized system which links a high rate of return on invested funds to levels of performance in the activity which the incentive awards program is designed to motivate.

U.S. Pat. No. 5,483,444, issued on Jan. 9, 1996 to Hindsman et al., discloses a computerized system for providing incentives for travel agents and awards cumulative credits to travel agents based on bookings of travel related reservations.

In addition to the problems noted above, merchants who sponsor an incentive awards program would like to be freed of the administration of the redemption or fulfillment processes. Some incentive award programs are subject to a type of fraud in which persons obtain coupons without being bonafide purchasers of the goods or services which are being motivated by the incentive awards program. Those coupons, if redeemed by parties who would otherwise not be entitled to do so frustrate the underlying motivation of running an incentive awards program.

Most of the incentive award programs do not permit a sponsor or an administrator of such a program to gather information about the customers. Further, it is difficult to provide instant gratification to a participant through an instant award. In addition, most incentive award programs do not adapt to the level of experience of the user, thus creating a monotonous presentation for the customer.

SUMMARY OF THE INVENTION

The invention discloses methods, apparatus, systems and computer program products for overcoming the problems of the prior art, addressed above.

In its most general form, the invention is directed to an interactive platform with which participants in an incentive awards program interact over a network. The network can be any type of network, such as a local area network, a wide area network, a public communications network, such as the Internet, an internal company network such as an Intranet, a CATV network, or a telephone network. In general, the interactive platform is arranged to interact with program participants to manage and administration the awards program in a way which overcomes many of the problems of the prior art.

In one implementation, a peel open certificate is provided for inclusion in packaging of items to be sold or for inclusion as part of a display or for dispensing at check-out by merchants dealing in the goods or services to be promoted by the incentive award program. The inside of the certificate contains a telephone number (preferably a toll free telephone number), instructions for using the certificate and a certificate number which is unique to each certificate. The instructions direct a participant in the program to dial the toll free telephone number where the user is prompted to enter the ten digit telephone number under which the user desires to register the certificates. A computer interfaces with a voice response unit to handle the incoming calls automatically. An entry is created in a database for each user and the database entry is utilized to track the awards for that particular user.

A particularly convenient type of award is an award of free long distance telephone time. When a user achieves sufficient award points, he is awarded, for example, fifteen minutes of telephone time. To use that time, the user calls the same telephone number dialed to register the certificate and receives an indication of his award balance and may redeem portions of awarded telephone time by specifying a destination number to which user desires to be connected. The computer causes a connection to be established to the destination number specified by the participant. The participant and the destination number are then connected until the conversation is completed or until the awarded time expires. Conveniently, a warning may be given before the allotted award time expires so the conversation may be terminated gracefully.

The ordering of interactions between a participant and a system changes from call to call under control of a call flow table. Thus, different messages can be played and different sequences of interaction with the participant can be undertaken.

The invention relates to computer apparatus for carrying out a promotional awards program, including a processor, a memory medium accessible by the processor, and a database stored on the memory medium, the database including information about participants in the program and information about how calls from a participant will be handled based on information about the participants. A number of processes run on the processor. The processes include, one to request the name and address of a participant, one to provide awards to a participant, one to redeem awards earned by a participant; one to poll participants for gathering information and one to provide messages to a participant. The processor is configured to provide participants with awards in quantities and value which are under the control of a sponsor of the promotional program. Awards can be delivered electronically, such as awards in the form of long distance telephone service and the electronic transfer of cash or credits.

The invention also relates to a system for carrying out a promotional awards program, which includes a network, a processor having a memory medium and a database stored on the memory medium, connected to the network, the database including information about participants in the program and information about how calls from a participant will be handled based on information about the participants, and network devices, connected to the network, for communications with the processor.

The invention also relates to a method of awarding promotional incentives to a participant by receiving a communication from the participant, retrieving information about the participant from a database based on information contained in the communication, and controlling interaction with the participant based on information about the participant retrieved from the database.

The invention is directed to a method of awarding promotional incentives to a purchaser in which a call is received from a purchaser, a certificate number is entered by the purchaser, and the award credits for the purchaser are incremented, based on the certificate number. One of the incentives is long distance telephone time which can be redeemed by calling the same number which the purchaser uses to enter a certificate number and requesting connection to a long distance number. A promotional incentive can also be a credit in cash or cash equivalent or merchandise.

In one implementation, the calling number from which the purchaser makes a call is identified automatically and used to access the purchaser's address in a database. The purchaser's address is confirmed by generating a vocal representation of at least a first few characters of the address and generating a question to the purchaser on whether the address is correct. In another implementation, the purchases is asked to speak the address to which the merchandise is to be sent and a response from the purchaser is stored.

A certificate is used as part of some promotional incentive programs. The certificate is a two piece certificate which opens to reveal a certificate number inside. A telephone number to call is also included inside. Selected callers are awarded instant winner award credits when they call.

The invention is also directed to a method of changing interaction with a caller who calls a telephone number as part of a promotional awards program, by storing an indication of the number of times a caller has called, and selecting interactions based on the number using a call flow table.

The invention is also directed to a method of awarding a prize to a participant as part of a promotional awards program by storing an indication of a quantity of time to which a participant is entitled to have access to long distance telephone service, and providing access to the participant to a telephone line having long distance access for a period of time-not to exceed the quantity of time.

The invention is also directed to a method of awarding promotional incentives to a purchaser by issuing certificates to participants upon purchase of goods or services to be promoted, each certificate having a unique identification, receiving a call from a purchaser including the unique identification, and incrementing award credits for a participant, based on the unique identification.

The invention is also directed to apparatus for awarding promotional incentives to a purchaser including a CPU having digital storage, a voice response unit, connected to the CPU and connected to a communications medium, and one or more databases, stored in the storage, containing participant information and information about certificates provided as part of the incentives.

The invention is also directed to a system for awarding promotional incentives to a purchaser including a telephone system, a voice response unit, connected to the telephone system, and a computer system connected to the voice response unit for identifying a purchaser and for awarding promotional incentives based on the number of a certificate in the possession of the purchaser.

The invention also relates to a computer program product including a memory medium, and a computer program stored on the memory medium, the computer program containing instructions for receiving a communication from the participant, retrieving information about the participant from a database based on information contained in the communication, and controlling interaction with the participant based on information about the participant retrieved from the database.

The invention also relates to a method of awarding promotional incentives to a user, by loading an interactive program, and while the user is running the interactive program, connecting to an interactive platform for providing at least one promotional incentive to the user. The interactive program can be a game stored on a CD-ROM.

The invention is also directed to computer program products for carrying out the techniques of the invention.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The invention will now be described with respect to drawings, in which:

FIG. 5 is an exemplary record layout of an award data base shown in FIG. 3.

FIG. 6 is an exemplary layout of a call flow table data base shown in FIG. 3.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

Best Mode for Carrying out the Invention

Figure 1:
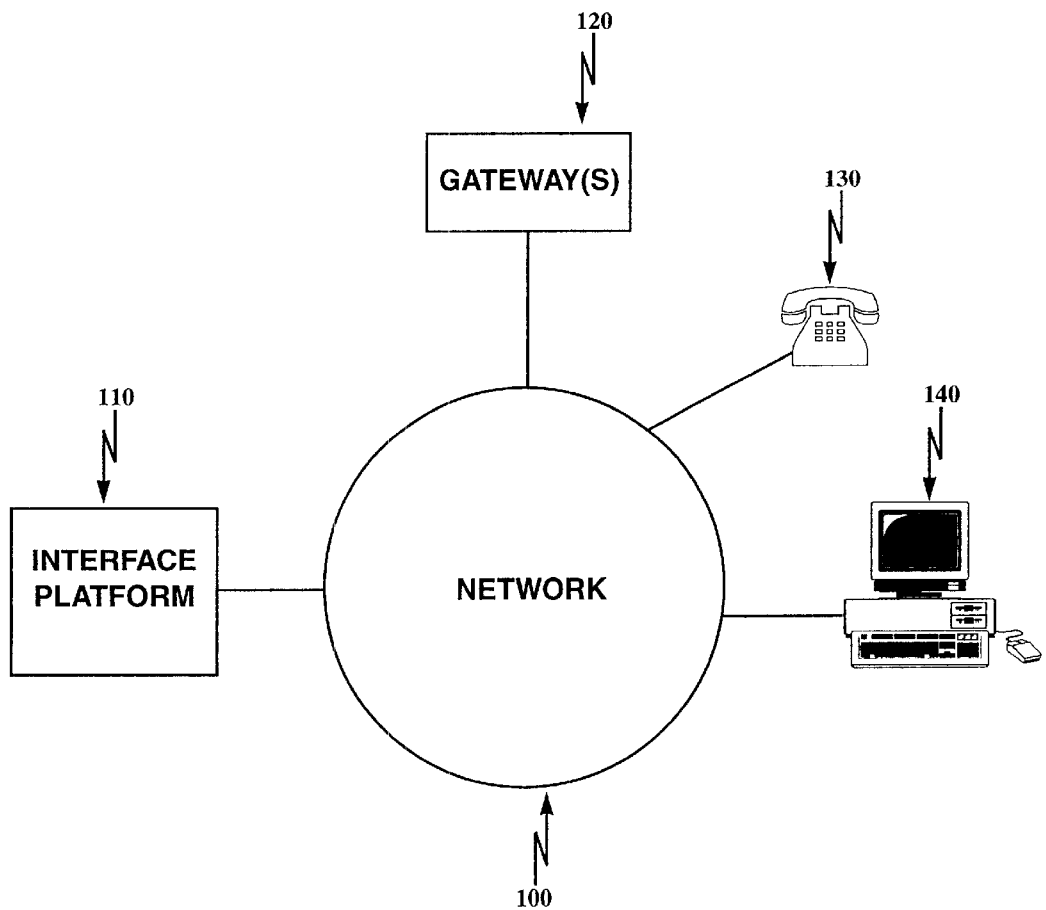
FIG. 1 is a block diagram of an exemplary system for carrying out the invention.

FIG. 1 is a block diagram of an exemplary system for carrying out the invention. An interactive platform 110 is connected to network 100 for servicing interactions with program participants over the network. Such interactions can arrive over the network from computer terminals such as terminal 140 shown in FIG. 1, from telephones such as shown in item 130 of FIG. 1 or over gateways 120 to other networks. Communications can arrive from program participants over any type of network. Examples of networks suitable for use with the invention include a local area network, a wide area network, an Internet, and Intranet, a telephone network, or a CATV network.

Figure 2:
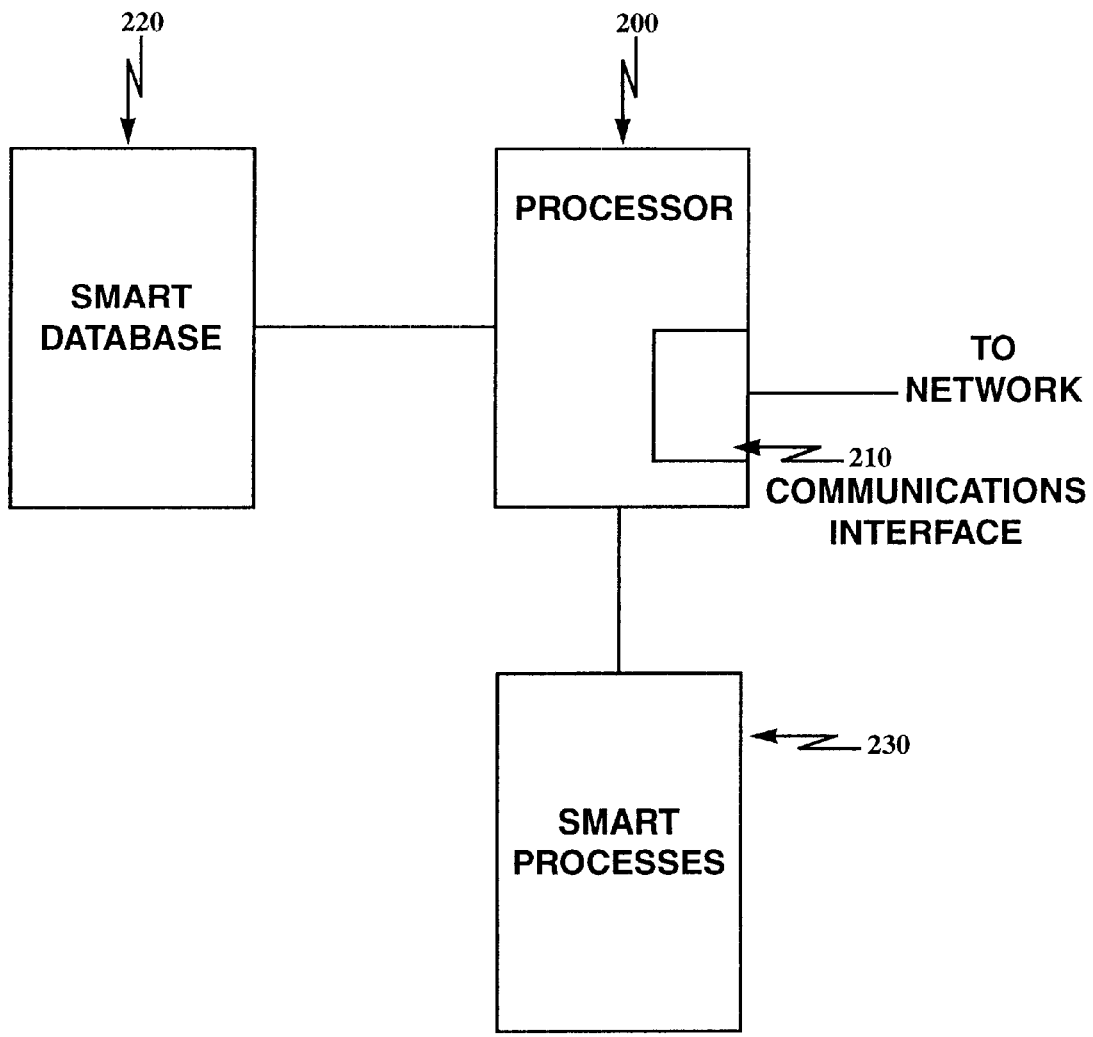
FIG. 2 is a block diagram of an exemplary interactive platform of the type shown in FIG. 1.

FIG. 2 is a block diagram of an exemplary interactive platform of the type shown in FIG. 1. The interactive platform includes a processor 200 coupled to a network over communications interface 210. Communications interface 210 is typically a communications board connected to the bus of the processor. A smart data base 220 contains the information needed to administer the awards program in accordance with the invention. Smart processes 230 are selectively executed as described more in detail hereinafter.

Figure 3:
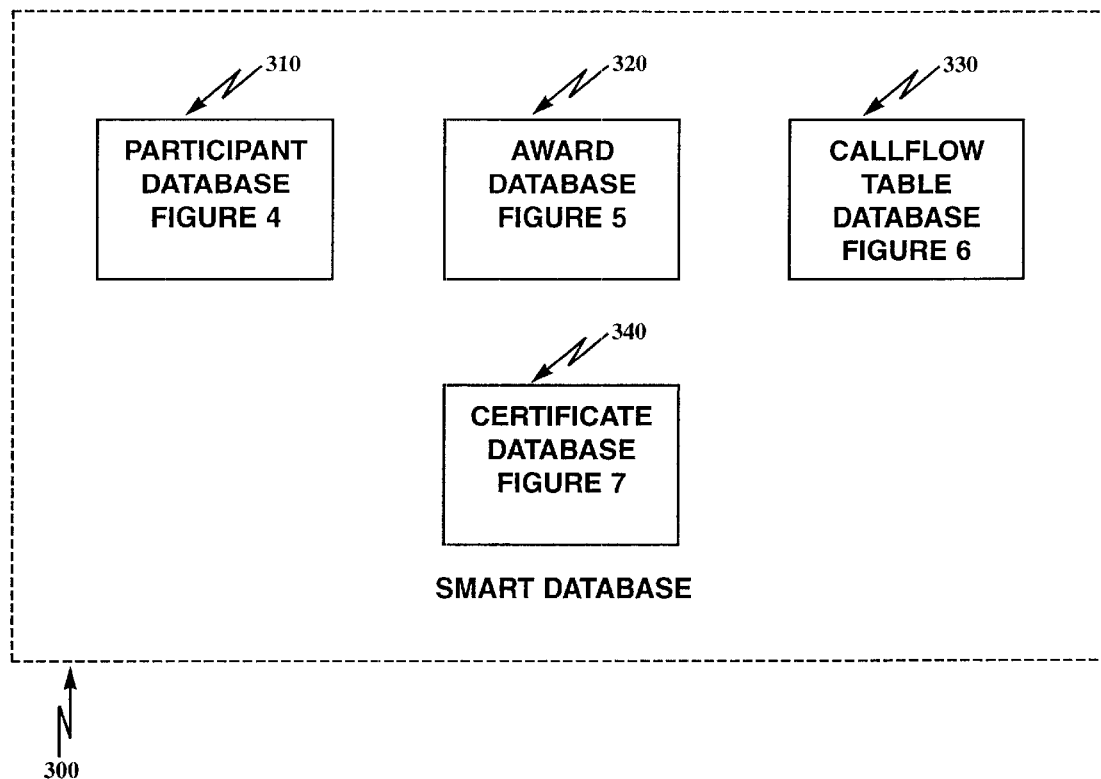
FIG. 3 is a representation of an exemplary smart data base shown in FIG. 2.

FIG. 3 is a representation of an exemplary smart data base shown in FIG. 2. The smart data base, in reality, consists of a plurality of data bases. It includes a participant data base 310, an award data base 320, a call flow table data base 330 and a certificate data base 340. Typical or exemplary record layouts for these databases are shown respectively in FIGS. 4, 5, 6 and 7.

Figure 4:
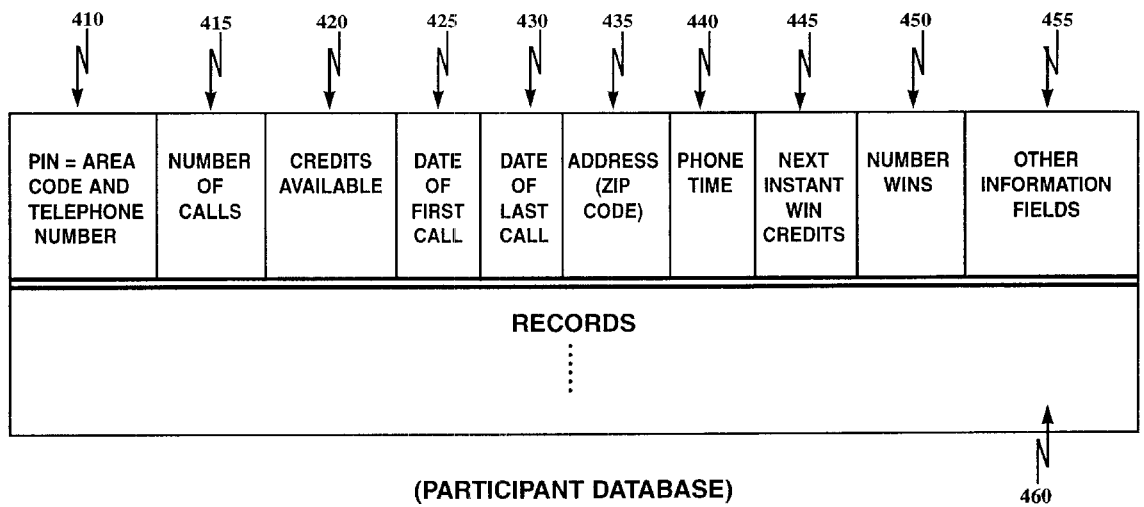
FIG. 4 is an exemplary record layout of a participant data base shown in FIG. 3.

FIG. 4 is a representation of an exemplary field layout for a participant database stored on the CPU in accordance with the invention. There is a record kept, for example, in the format shown in FIG. 4, for each participant in the incentive awards program. The database is keyed to a personal identification number 410 which, in a telephone network environment preferably consists of the area code and telephone number or user of the participant. In a computer network environment, a user network address would be preferred. Field 415 contains an indication of the number of times a participant has called or connected. Field 420 constitutes an accumulated total of the credits available for use by the participant. This field is incremented as awards are received or as award certificates are reported to the system and is debited when awards are redeemed. Field 425 and 430 represent respectively the date of the first time a participant called and the date of the last call from a participant. Field 435 contains address information for the participant, which is selectively collected, preferably when needed to send an award. Field 435 contains as a sub-field, separately accessible, a zip code field which, if no address is present, is set equal to all zeros. When address information is gathered, the zip code field is changed to the actual zip code. Field 440 contains a number of minutes of free long distance phone time available to the participant as the result of redeeming awards. Field 445 contains a number indicating the number of award credits that can be instantly won the next time a participant is identified as an instant winner. This number may be zero, in which case no credits are awarded or it may be or contain a non-zero number to be added to the credits available when a participant is an instant winner upon call in. The algorithm providing the number for filling in this field, can be adjusted to provide a desired statistical level of instant winners by changing the frequency with which zeros are inserted in this field. Field 450 is a count of the number of times a participant has won an award.

Field 455 represents other information fields such as the number of times a participant has redeemed award credits for awards or fields related to demographic information about the participant.

FIG. 5 illustrates a layout of an exemplary award level table in accordance with the invention.

The award level table basically associates the credits required to earn an award with an award code and a description of the award. The credits required are shown in field 500. The award code is shown in field of 510. A reference to an award description file is shown in field 520. Field 530 specifies whether or not it is necessary to have the address of the participant for purposes of sending the award.

FIG. 6 illustrates a layout of an exemplary call flow table in accordance with the invention. A number of calls is shown in column 600 and associated with each particular number is a listing of a set of modules which specify the order in which interactions with the participant occur. There are, for example, ten basic types of modules shown in this example although some modules exist in a variety of versions which can be specified by an index. Those modules are:

| MODULE NAMES | NAME OF THE MODULE |
| --- | --- |
| GP Module | Greet\PIN |
| SM Module | Select Menu |
| CN Module | Certificate Number |
| SB Module | Speech Balance |
| AR Module | Award Redemption |
| M(n) Module(s) | Promotional Message(s) |
| P(n) Module(s) | Polling |
| IW Module | Instant Win |

-continued

| MODULE NAMES | NAME OF THE MODULE |
| --- | --- |
| NC Module | Name Capture |
| GB Module | Goodbye |

The modules are discussed more in detail in a telephone embodiment described more in detail hereinafter The entries shown in column 610 of the call flow table of FIG. 6 utilize the abbreviations above.

Although the call flow table shown in FIG. 6 is illustrated as responding to the number of interactions represented by a particular call, the particular sequence of modules invoked can be a function of other information. For example, particular sequences can be utilized which are specific to the manufacturer of a product or the provider of a service being promoted as identified by the source field of a certificate data base entry, discussed hereinafter. Other customized sequences of modules specified in a call flow table can be specified by information from the participant data base, other than the number of the call. However, it is convenient, particularly in the early interactions of a participant with the interactive platform to specify a call flow sequence based on the number of times the participant has called or connected to the platform.

Figure 7:
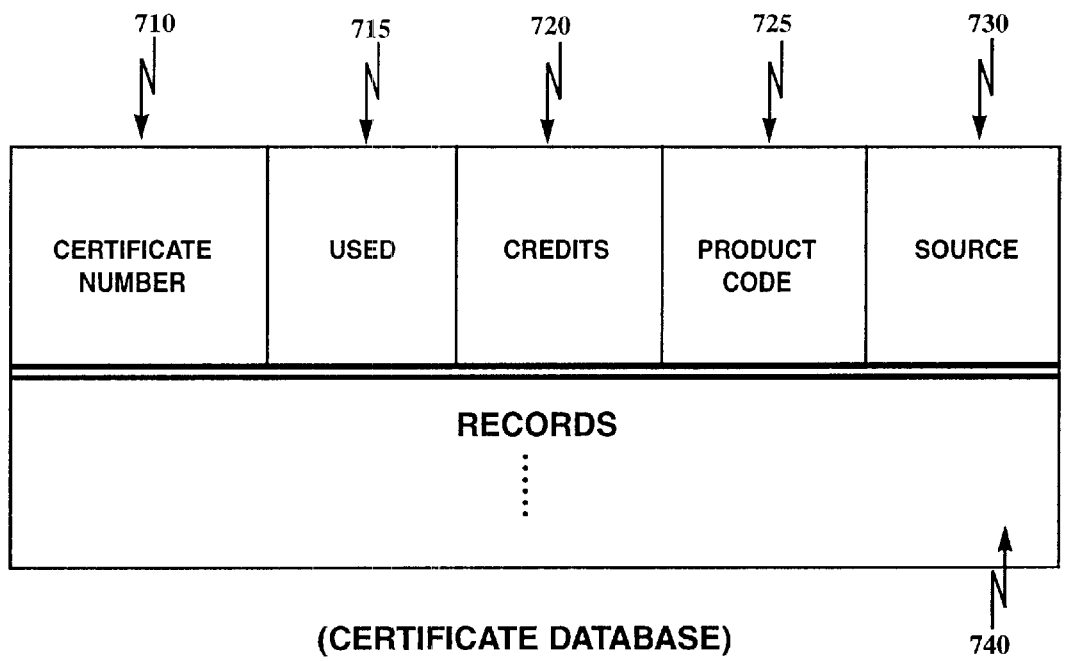
FIG. 7 is an exemplary layout of a certificate data base shown in FIG. 3.

FIG. 7 is a representation of an exemplary field layout for a certificate database in accordance with the invention. A record is kept of each certificate. The records are keyed by certificate number (field 710). Field 715 is used to indicate that the certificate has been used, that is, reported by a participant and credited to the participant's account. Field 720 indicates the number of credits of the award value associated with a particular certificate number. Field 725 indicates a product code such as the universal product code associated with the product for which the certificate was issued. Field 730 indicates the source from which the certificate was received by the participant, such as the distribution chain or merchant through which products having the product code are distributed.

The source field 730 is particularly useful because it allows great flexibility in identifying the origin of the product involved in the promotion. Such a field can, and will, of course, identify a manufacturer or producer of the goods or services. In addition, it can identify divisions or manufacturing facilities, stops along the chain of distribution, the store or service facility from which the product or services originated and, under certain circumstances, even the employee who accounted for the sale. By appropriately controlling the printing and distribution of the coupons or the certificates, a great deal of information about how a particular product or service got into the hands of a purchaser can be gathered.

Figure 8:
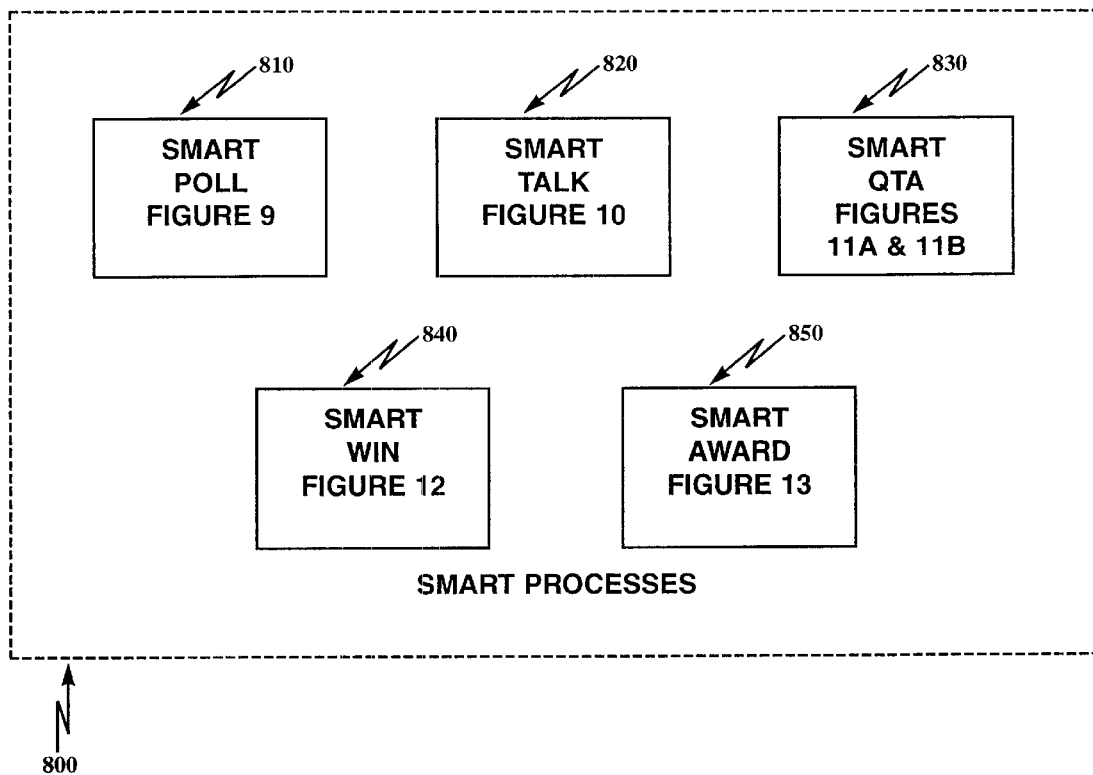
FIG. 8 is a representation of exemplary smart processes used in accordance with the invention.

FIG. 8 is a representation of exemplary smart processes used in accordance with the invention.

The smart processes 800 include generally, particular types of functionality which can be selectively activated as part of an overall interaction sequence to carry out an award or promotional program. For example, smart processes 800 include a smart poll capability 810, a smart talk capability 820, a smart Q & A capability 830, a smart win capability 840, and a smart award capability 850. Each of these is discussed in greater detail in connection with FIGS. 9, 10, 11A and 11B, 12 and 13, respectively.

Figure 9:
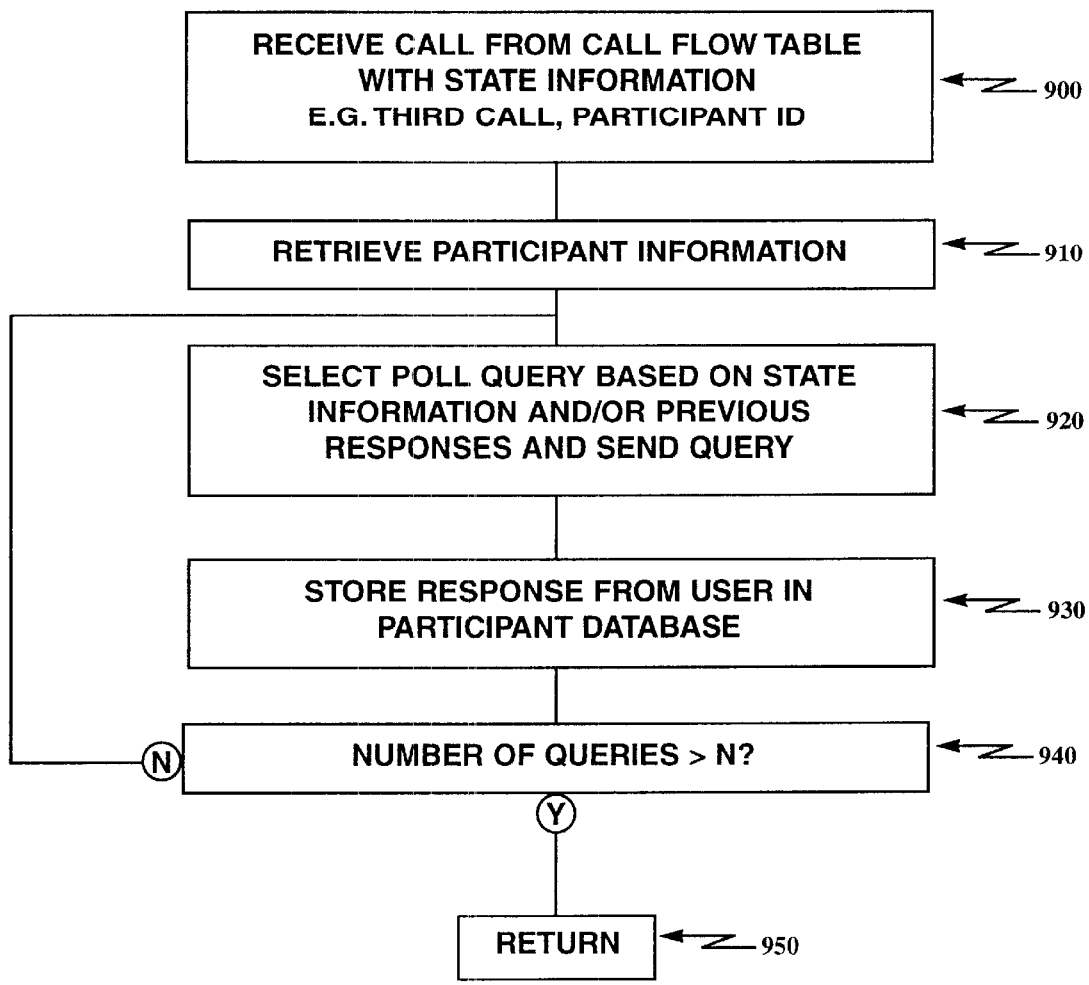
FIG. 9 is a flow chart of an exemplary smart poll process used in accordance with the invention.

FIG. 9 is a flow chart of an exemplary smart poll process used in accordance with the invention. A typical polling sequence may contain a plurality of queries. However, a polling sequence is preferably restricted to a relatively small number of queries. The process is invoked by a call from the call flow table which may be accompanied by state information such as the number of the interaction with the participant and the participant identifier (900). With the participant identifier, the participant information may be retrieved from the participant database (910) and a particular poll query selected based on state information and/or previous responses by the participant and the query is sent to the participant (920). In a telephone environment, a voice response unit may generate the query in audible form for presentation to the participant. In a computer network, the query may be sent as a short message. A response from the participant (930) is stored in the participant data base and a check is made to determine whether the number of queries posed is greater than N (940). If it is not, additional queries are selected (940-N), whereas if the number of queries posed exceeds N, (940-Y), the process returns (950).

The smart poll process permits very individualized customization of polling queries directed to a program participant. As the participant's record in the participant data base evolves with more and more information, that information can be used to control the presentation of information to a participant to feature certain products to which the participant may be considered receptive given the demographic information captured about the participant during the polling process. For example, if, in response to a polling question, a participant indicated that he had no children, then any subsequent questions relating to children or children's products would be excluded from presentation to that participant, whereas participants with children would receive such queries. The selection of queries can be a simple if/then/else table in a simple embodiment or can utilize artificially intelligent techniques for selecting polling questions to pose to a participant. What is particularly useful is that, as the participant information in the participant data base record evolves, the type of queries presented to the participant change as well.

Figure 10:
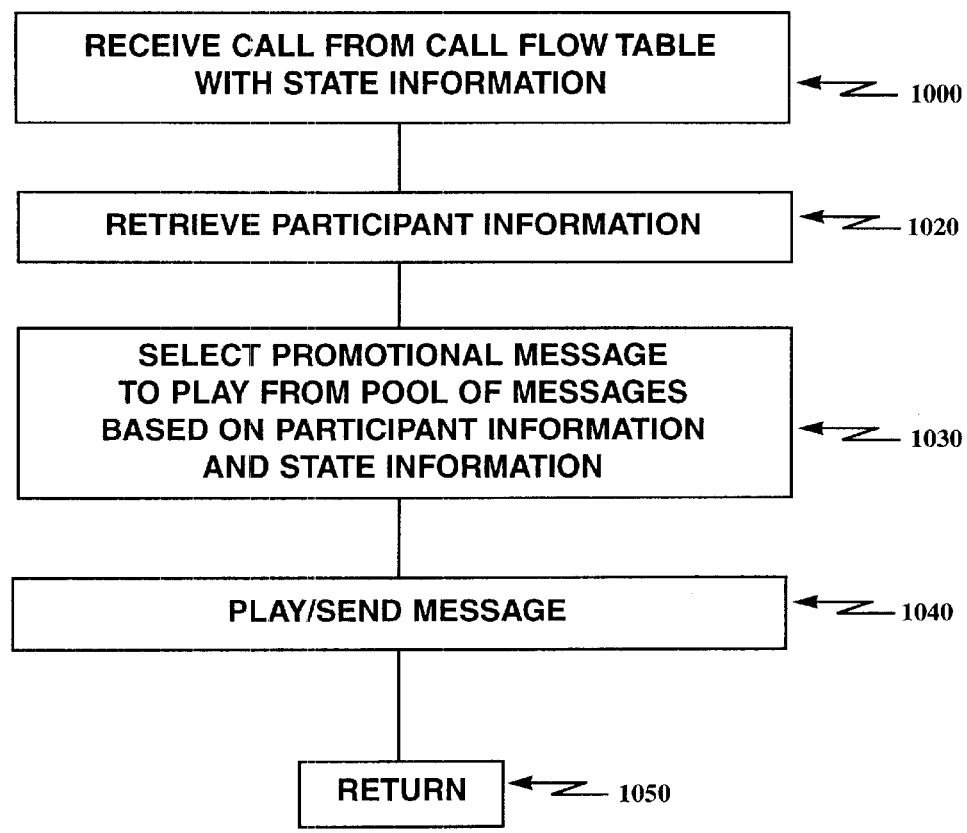
FIG. 10 is a flow chart of an exemplary smart talk process used in the accordance with the invention.

FIG. 10 is a flow chart of an exemplary smart talk process used in accordance with the invention. The purpose of the smart talk process is to permit a variety of messages to be played to a participant during the interaction with the interactive platform.

The processes invoked, typically, by a call from the call flow table passing state and participant information as previously described (1000). The participant information is retrieved from the participant data base (1020) and a promotional message to be played selected from the pool of messages based on participant information and state information (1030), the message is played or sent to the participant (1040) and the process returns.

Thus, whereas the smart polling process gathers the S information for about the participant, the smart talk process utilizes that information to select the particular promotional message to play for the participant based on the information recorded in the participant data base and state information.

For example, if the participant data base indicated that there was a baby in the house under 6 months old, in response to a poll query, a different promotional message for baby food would be played than if the baby were 24 months old. Thus, the promotional messages provided to the participant can be specific to the participant's circumstances.

Figure 11A:
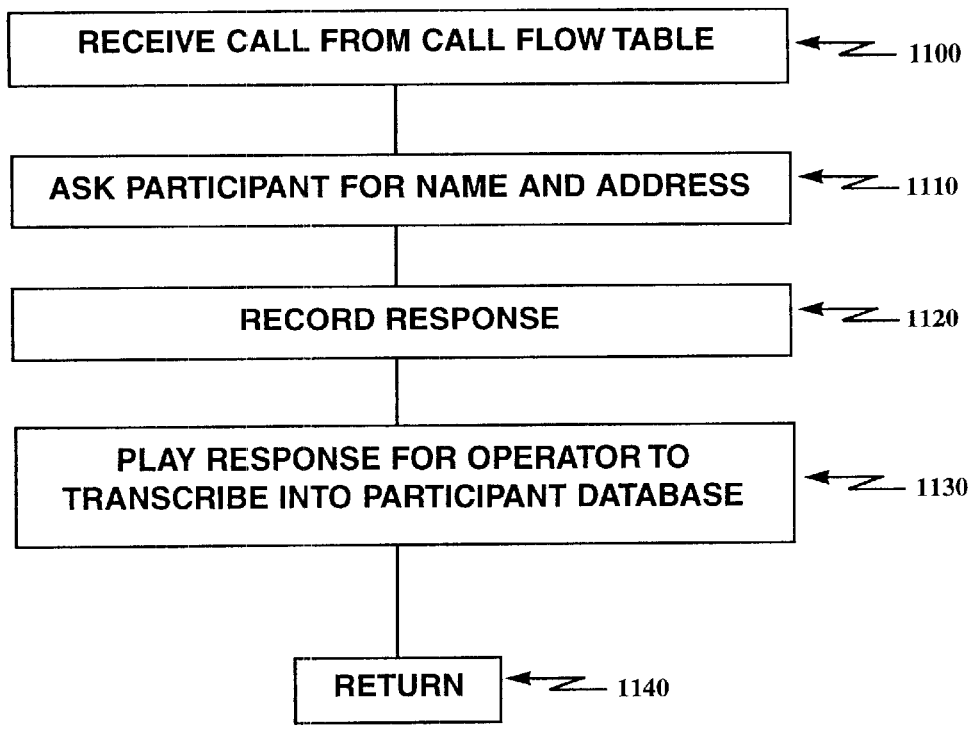
FIGS. 11A and 11B are flow charts of alternative smart Q & A processes used in accordance with the invention.
Figure 11B:
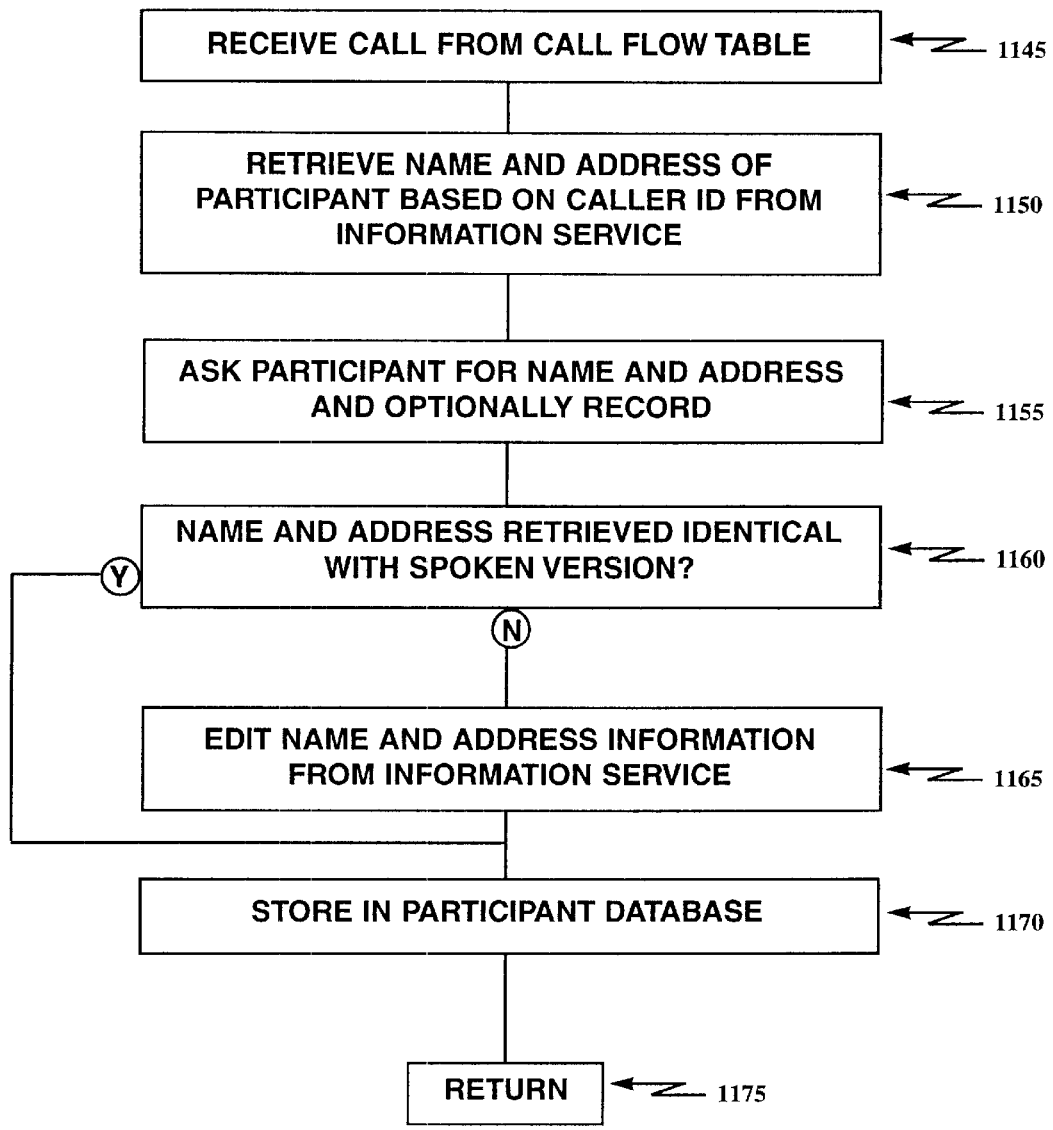

FIGS. 11A and 11B are flow charts of alternative smart Q & A processes used in accordance with the invention. The purpose of the smart Q & A process is principally to obtain name and address information from a user. It is used more commonly in the telephone network environment, although it would also be utilized in an integrated network. FIG. 11A depicts a process which is designed to permit a verbal statement of the participant's name and address to be captured and incorporated into the participant data base. The process begins with a call from the call flow table (1100) and a participant is asked to provide his or her name and address (1110). The verbal response from the participant is recorded (1120) and, played, at a later time, for an operator to transcribe into the participant data base (1130) and the process returns. The recording and playback, of course, could be omitted if an operator were available to take the information live.

FIG. 11B represents a more sophisticated version of the flow chart of the process described in the flow chart of FIG. 11A. When the process is activated by a call from the call flow table (1145), the interactive platform retrieves the name and address of the participant based on caller ID information by, for example, dialing up an information service (1150). When the participant is asked for his or her name and address, it is optionally recorded and compared with the name and address retrieved from the information service. If they are identical (1160-Y), the information retrieved from the information service is stored in the participant data base (1170) and the process returns. If there are variations, such as a change of name or zipcode (1160-N), the information received from the information service is edited (1165) and the revised version is stored in the participant database (1170) and the process returns. The recording of the response can occur in either analog or digital form. The use of name and address information retrieved from an on line service reduces the service time required of an operator because the operator need not manually type in the information.

A particularly powerful use of this capability is found under the circumstance when a sponsor of a promotional program wishes to identify his "good customers." A good customer might be defined as a customer who has made three purchases of a particular type in the last thirty days. By invoking the name and address capture routine of FIGS. 11A and 11B, only for those participants who have registered certificates for the three purchases in question within thirty days, the sponsor of the program can receive a list of names and addresses which contain only those customers who have made such purchases. In the prior art, a sponsor of a program was limited to either capturing everyone's name and address, or no one's. This permits the name and address capture to be customized to the needs of the particular sponsor. As a result, since the cost of direct mailings is very high, the sponsor can customize a mailing to only his best purchasers, however the sponsor may define that term. As a result, a sponsor will not waste resources in conducting a direct mailing to customers who might not be responsive to his entreaties.

Figure 12:
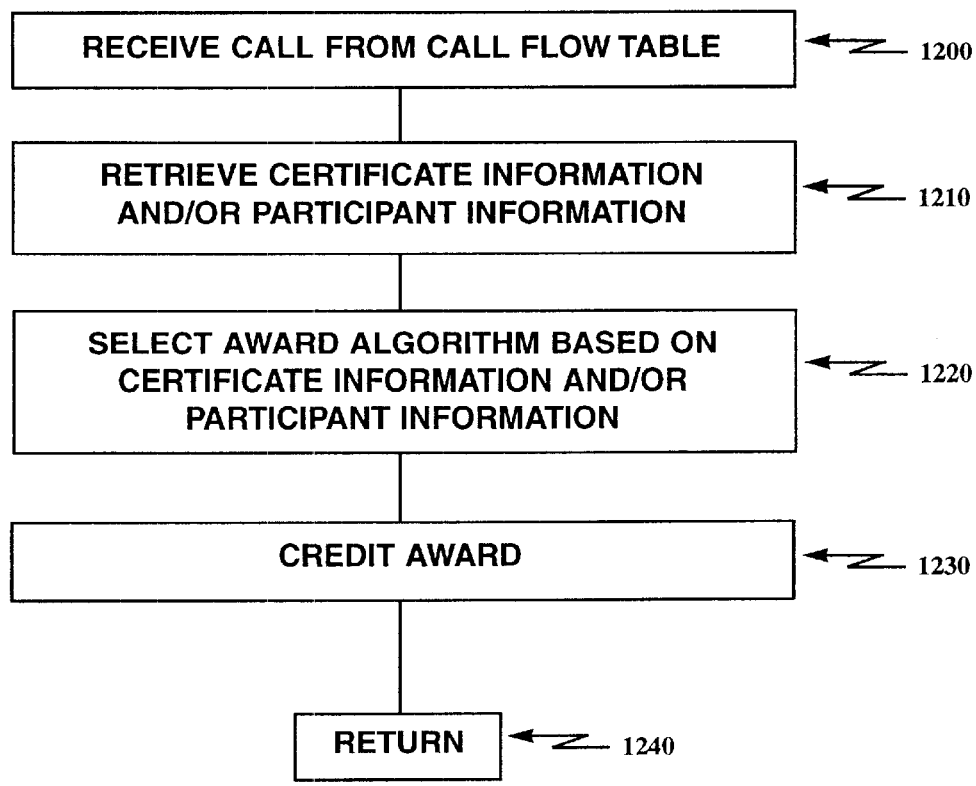
FIG. 12 is a flow chart of an exemplary smart win process used in accordance with the invention.

FIG. 12 is a flow chart of an exemplary smart win process in accordance with the invention.

As with the other processes, the smart win process begins with a call from the call flow table (1200) passing state and/or participant information. In this case, it may also pass certificate information such as a certificate ID (1210). With certificate ID information, certificate information from the certificate data base may be retrieved. A particular award algorithm is selected (1220) based on certificate information and/or participant information as discussed more hereinafter. If the participant is a winner, the award amount is credited (1230) and the process returns. The function of the smart win process is to make awards to certain participant in a controlled manner.

A number of award algorithms are selectively usable in accordance with invention. The first award algorithm is a simple, random selection algorithm. Each user who interacts with the interactive platform essentially engages in a lottery with a controlled probability of an award determined by a random or pseudo-random process. For example, a random algorithm may be utilized to randomly select a winner with a parameter driven probability of success of, for example, 0.01. Thus, one out of every 100 participants connecting to the interactive platform would be an instant winner using this type of award algorithm. Such an algorithm can simply involve a random number generation within a range of values with only one or more values constituting a winning situation.

A second award algorithm that is selectively utilized involves selecting every tenth interaction with the interactive platform for an award. Thus, the arrival of a connection from a particular participant serves as a selection variable and if the arrival is an Nth arrival, it is rewarded. One can spread out the levels of awards so that, although there is an award with an Nth interaction, higher level awards occur, for example, at every 5Nth interaction.

A third category of award algorithms involves a control constant win algorithm based on, for example, a certificate, such as one described in conjunction with FIGS. 15A–D hereinafter. An algorithm of this type permits a sponsor of a promotional program to control the winning process in a way which permits award expenditures to be kept within budget.

One form of a control constant win algorithm is based on the source field of the certificate as contained in the certificate data base described previously. Thus, every Nth interaction for a participant engaging in a transaction with a particular source might be rewarded.

Since a sponsor might be more interested in the quantity of goods sold or ordered rather than in the number of interactions, another control constant win algorithm involves rewarding every interaction which accumulates a quantity of goods ordered or purchased that exceeds a particular threshold. Thus, if a wholesaler wished to reward a customer who purchased over ten cases of goods, the aggregate orders would be accumulated, based on certificates, until the threshold was exceeded, at which time the award would be made. Thus, a customer who ordered ten cases of goods on ten different occasions would be rewarded equally with one customer who ordered ten cases of goods on one occasion.

A third control constant win algorithm involves guaranteeing a particular prize to a particular source. As indicated above, the source field of a certificate data base can identify a manufacturer, a step in the distribution chain, a retailer, a store of a particular retailer, or whatever level of detail may be required for a particular award program. A particular sponsor may wish to guarantee a prize to a particular level of the distribution chain. For example, it may be that a sponsor of a program may wish to ensure that a first prize is awarded in each and every store of its retail outlets. This type of award algorithm can be achieved using the source field of the certificate data base.

In another control constant win situation, an interactive game, such as football, might be undertaken to hold a participant's interest in the interactive process. For example, a football game might involve a selection on the part of a user of whether, for a particular down, a football team should punt, pass or kick. The user would select which option. However, there would be a winning and a losing version of each choice available to the user. The number of winning versions would be determined in a manner which would be consistent with controlling a prize budget. However, the user selection would still provide the excitement of a play description in which his selected option would be executed.

By using the source field of a certificate, expected wins can be spread across a distribution channel in whatever manner desired.

Figure 13:
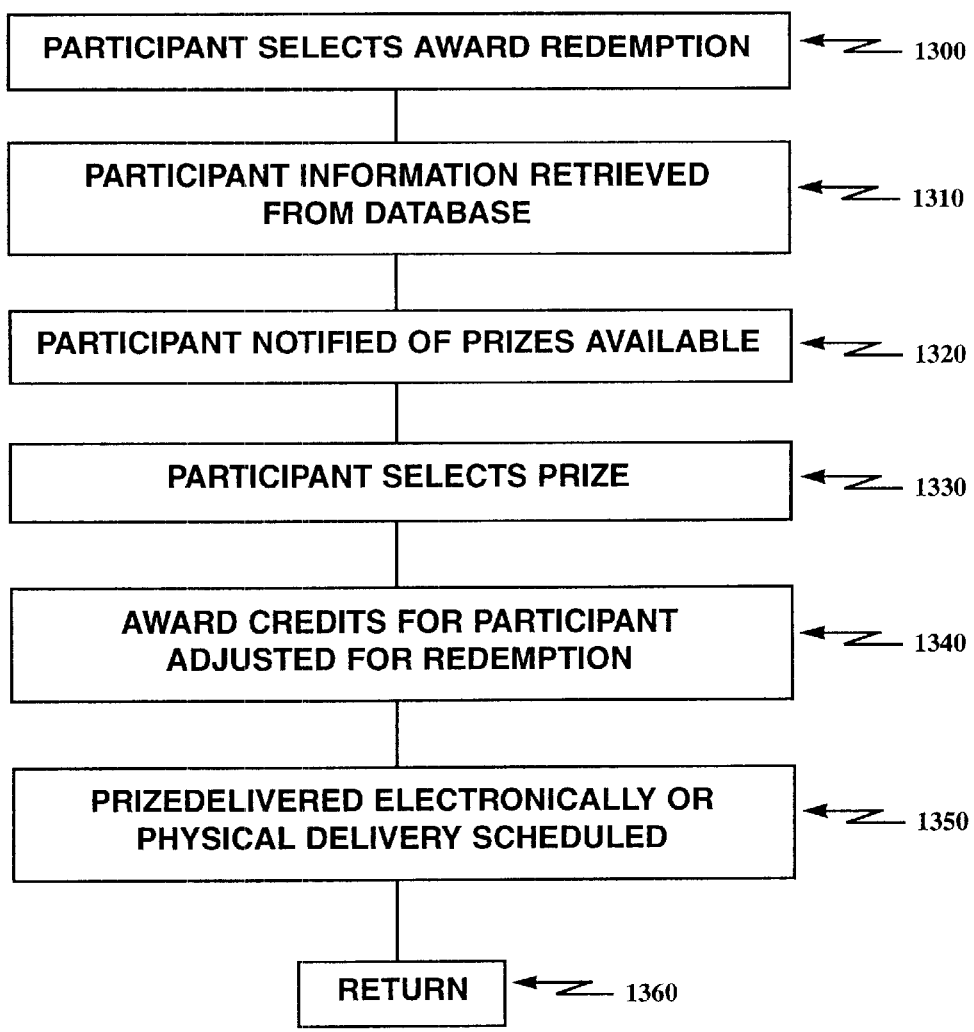
FIG. 13 is a flow chart of an exemplary smart award process used in accordance with the invention.

FIG. 13 is a flow chart of an exemplary smart award process in accordance with the invention. During a participant interaction, a participant will be offered the opportunity to select award redemption. When the participant selects award redemption (1300), the participant information is retrieved from the data base which includes information about awards previously received (1310). A participant is notified of the prizes available for the cumulative value of awards the participant has received (1320), and the participant selects a prize, if the participant so desires (1330). The award credits for a participant are then adjusted for the redemption (1340) by reducing the award credits available in the participant data base for the participant. The prize selected by the participant can be instantly delivered if it is an electronic prize or, physically delivery of a physical prize can be scheduled (1350), and the process returns.

There are many types of electronic prizes which can be delivered on-line. As illustrated more, hereinafter, in the detailed example, a prize can be a certain number of minutes of long distance telephone time. Alternatively, an electronic prize can be an electronic transfer of digital cash or an electronic transfer to a banking institution of the user's selection. There are other types of prizes which can be delivered electronically. For example, in a CATV system environment, the behavior to be rewarded might be usage of a certain number of pay-per-view programs and the reward for the desired behavior of using a certain number of pay-per-view programs would be a credit against the next month's CATV bill or a free premium channel for a period of time, or a free pay-per-view event.

As can be seen from the description of the interactive system described to this point, great flexibility is available in putting together an award program which can meet almost every need of both a sponsor of such a program, and of a participant. The individual processes described above, can be put together selectively to achieve a customized response for any particular sponsor or for any particular system environment.

FIGS. 14–26 will be used to describe a particular application in more detail showing how the functionality of individual smart processes is combined with the information contained in the smart data base to carry out a particular promotional program. In the example set forth in FIGS. 14–26, the network is a public switch telephone network and the interactive platform provides the appropriate interfaces to that network.

Figure 14:
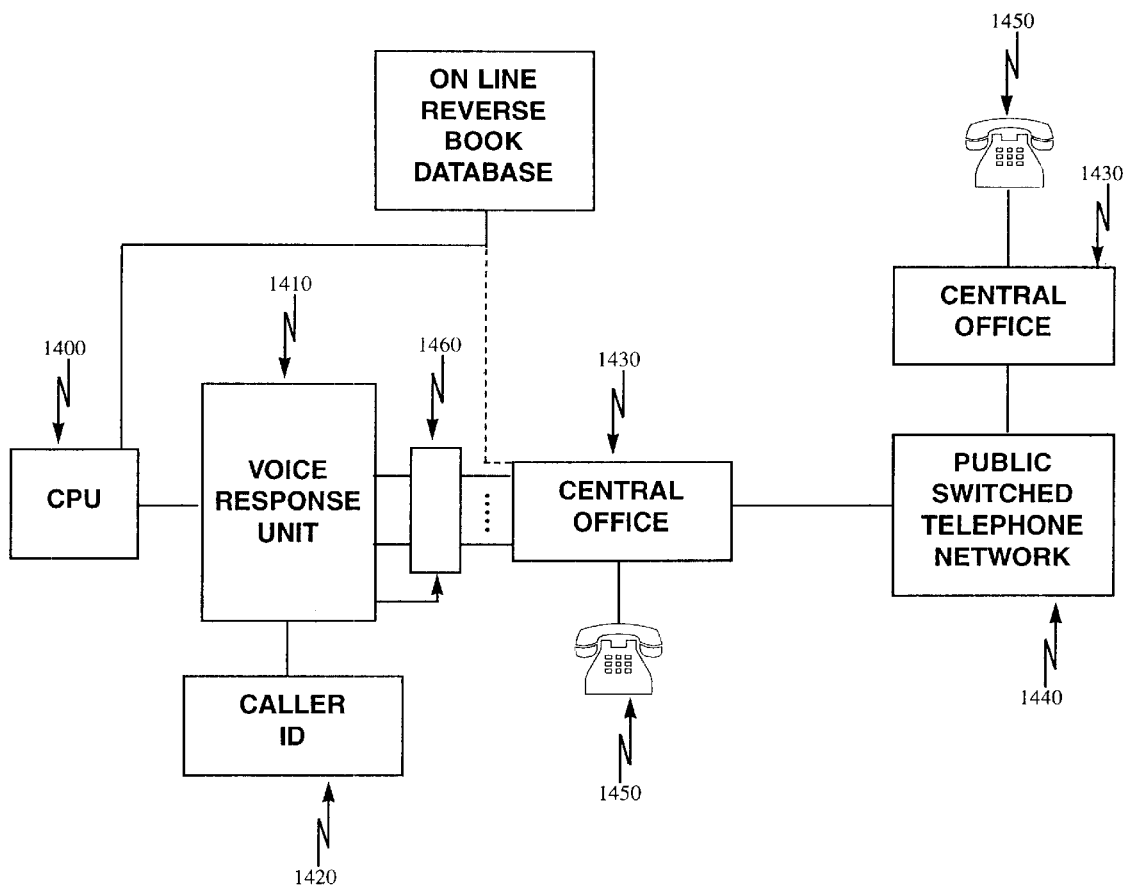
FIG. 14 is a block diagram of a specific system using a telephone network for carrying out the invention.

FIG. 14 is block diagram of an exemplary system useful for carrying out the invention in this particular application. As shown in FIG. 14, individual telephone subscribers 1450, are connected to respective central offices 1430 which may be linked over portions of a public switched telephone network 1440 such as a tandem switch. When a subscriber 1450 calls a toll free telephone number identified inside the certificate, to register a certificate as part of the incentive award system, the user is connected to a voice response unit at 1410 which interacts with CPU 1400 to provide messages to the user as directed by the CPU and to receive and store responses from the participant over the telephone network. A connection unit 1460 is selectively activated to permit connection of an incoming call from a participant 1450, to an outgoing trunk which provides long distance service for the participant under certain award conditions, to be described more hereinafter.

Figure 15A:
FIGS. 15A, 15B, 15C and 15D are front, rear, inside left and inside right views of an exemplary certificate in accordance with the invention.
Figure 15B:
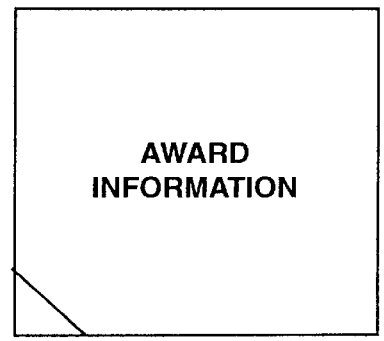
Figure 15C:
Figure 15D:
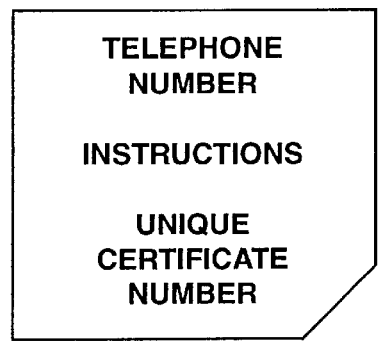

Operation of the awards system in accordance with the invention centers around a certificate. FIGS. 15A, 15B, 15C and 15D represent front, rear, inside left and inside right views of an exemplary certificate, respectively, in accordance with the invention. The front of the certificate contains sponsor information such as a logo, and identification of the award program. The reverse typically includes award information such as the type of prizes available and how to redeem an award. The coupon is constructed, preferably, of light cardboard with full color printing at least on the outer front and reverse portions of the certificate. The certificate is constructed so that it opens like a book when slight pressure is applied to separate the front and back sheets. As shown in FIG. 15D, a corner is removed from the blank used to form the certificate to facilitate that separation. The views in FIGS. 15A and 15B are shown as if the two sheets were folded together prior to opening. By removing the lower right hand corner of the right sheet, as viewed in FIG. 15D, the lower right corner of the front sheet can be utilized to initiate a peeling back action to separate the front and back sheets. FIGS. 15A and 15B depict the certificate in the unopened state, whereas FIGS. 15C and 15D necessarily depict the certificate as opened in order to view the inside left and inside right information.

Figure 16:
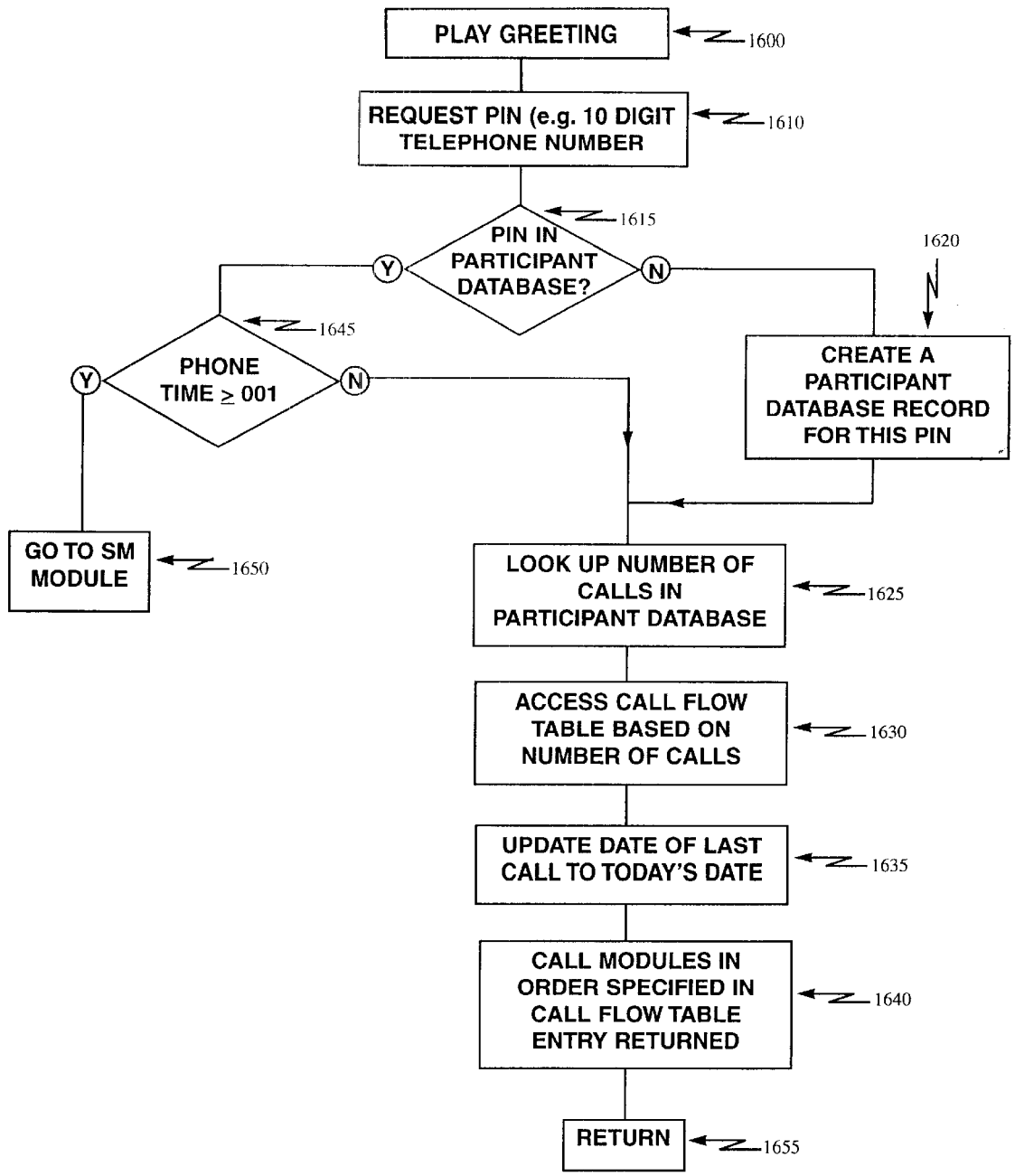
FIG. 16 is a flow chart of an exemplary Greet\Pin (GP) module in accordance with the invention.

FIG. 16 is a flow chart of an exemplary Greet\PIN (GP) module in accordance with the invention. When a call is received at the voice response unit, a module initiates a greeting (1600), and a personal identification number (PIN), such as a ten digit telephone number, is requested of the calling participant (1610). If the PIN number is not in the participant's database (1615-N) a participant database record is created for this PIN (1620). If a PIN number is in a participant database (515-Y), and if the phone time is one minute or greater (1645-Y), the SM module is called (1650). If the phone time is zero (1645-N), the number of calls in a participant database record for that PIN is accessed and a call flow table is utilized to determine the order and sequence in which interactions with participant occur (1630). The date of the last call is updated to today's date in the participant record (1635), modules are sequentially called in the order specified in a "call flow table" (1640), and after all the modules have been called, the process returns or loops to await the next arrival of a participant call.

Figure 17:
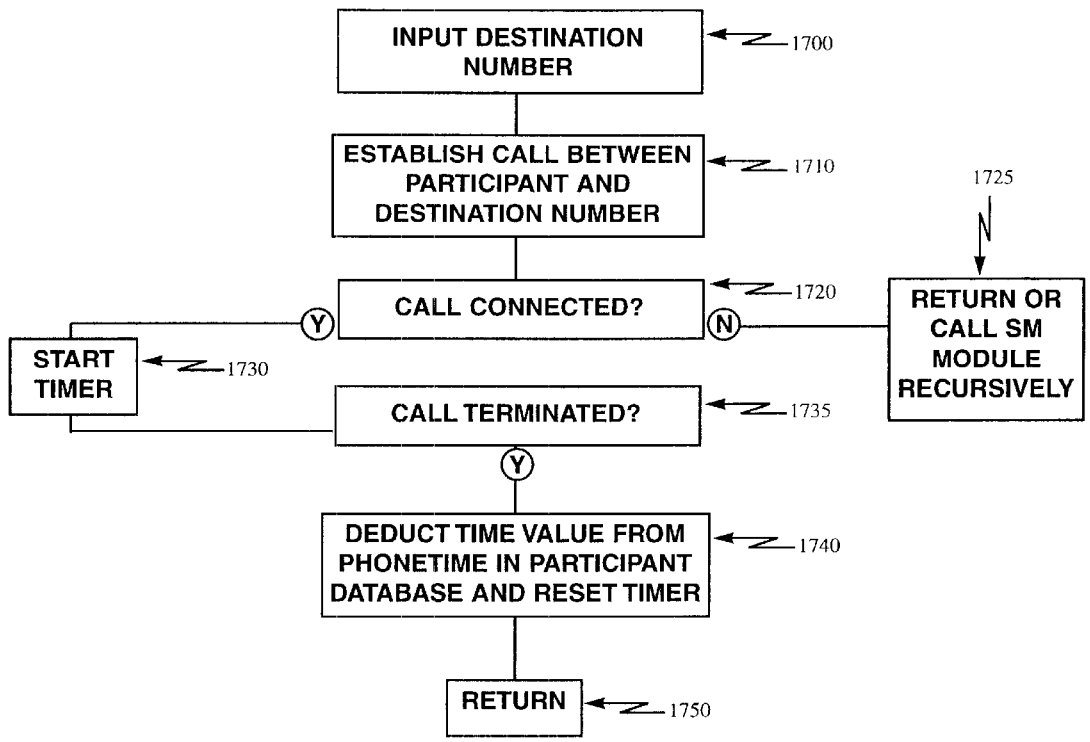
FIG. 17 is a flow chart of an exemplary phone card program in accordance with the invention.

FIG. 17 is a flow chart of an exemplary phone card program in accordance with the invention. When a participant earns a sufficient level of credits to qualify for an award, one of the awards which may be selected, as shown in FIG. 5, are a certain number of minutes of long distance service. The cumulative number of minutes awarded is stored in the participant database record for the participant. This entry in the database functions like a phone card to the extent that it may be redeemed upon request to complete a long distance call. FIG. 17 illustrates an exemplary way of doing this. Access to this module is typically achieved through the SM module illustrated in FIG. 18, described later When the module of FIG. 17 is entered, the voice response unit requests the input destination number for the long distance call (1700). As discussed above, the system shown in FIG. 14 seizes an outgoing trunk to the long distance carrier and dials the destination number specified by the participant. When the called destination number answers, a connection is made between the participant and the destination number (1720-Y) and a timer is started (1730). When the call is terminated (1735), the value in the timer is deducted from the phone time in the participant database and the timer is reset (1740). The module then returns. If connection cannot be made to the destination long distance number (1720-N), either the module SM will be called recursively or the process can return.

Figure 18:
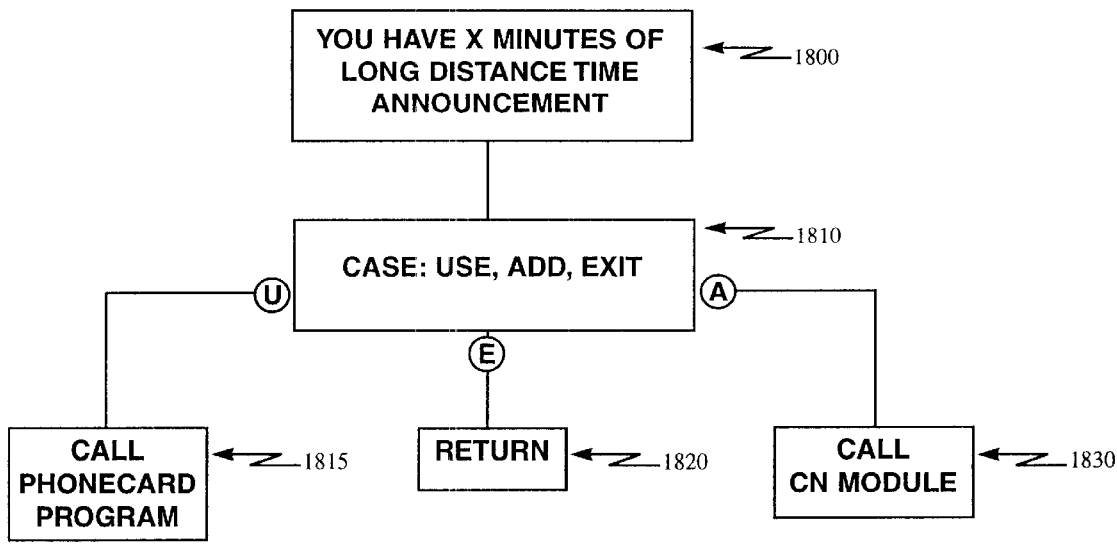
FIG. 18 is a flow chart of an exemplary select (SM) module in accordance with the invention.

FIG. 18 is a flow chart of an exemplary select menu (SM) Module in accordance with the invention. This module is typically entered from the GP module shown in FIG. 16. When the module is entered, the voice response unit announces to the participant that the participant has X minutes of long distance time available (1800). The participant is prompted (1) to either use some of the existing time (1810-U) in which case the phone card program is called (1815), (2) to add credits with a new certificate (1810A) in which case the CN Module, shown in FIG. 19, is called (1830), or (3) to exit the system in which case the process returns.

Figure 19:
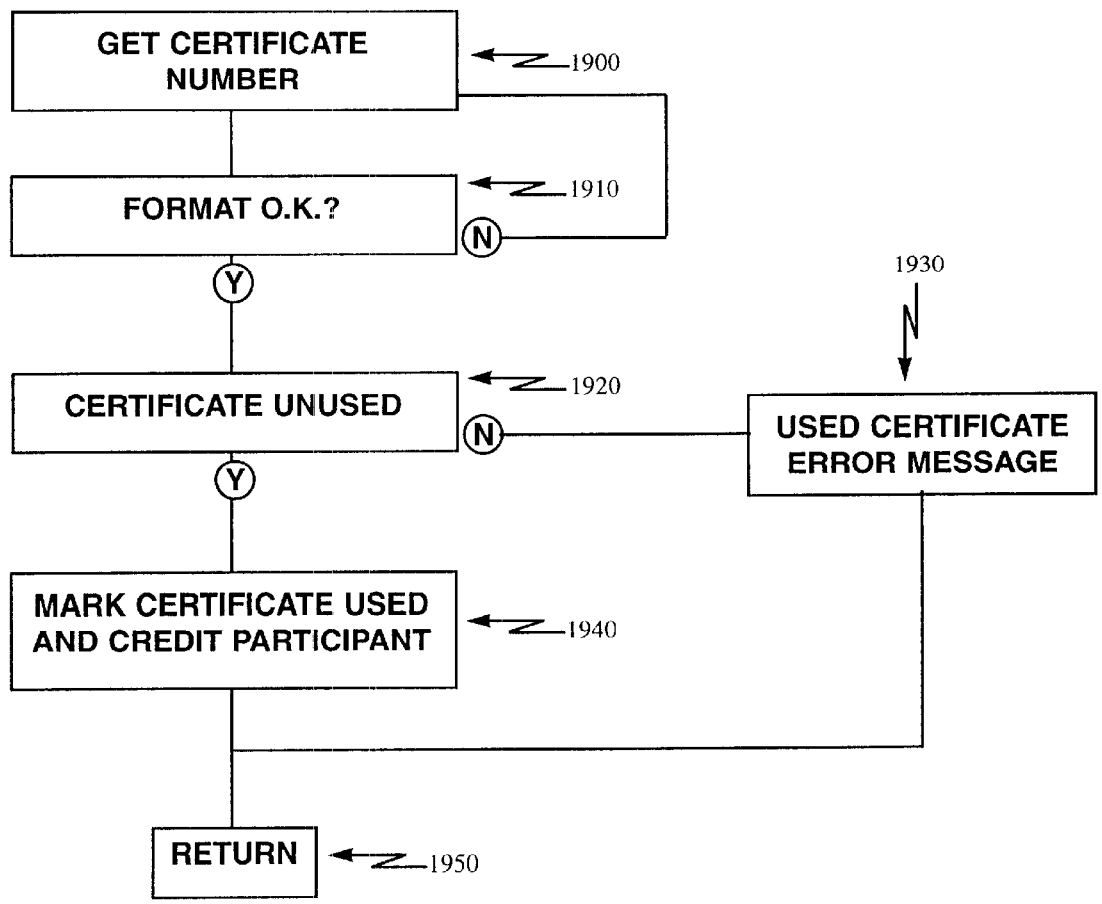
FIG. 19 is a flow chart of an exemplary certificate number (CN) module in accordance with the invention.

FIG. 19 is a flow chart of an exemplary certificate number (CN) module in accordance with the invention. When this module is invoked, the user is calling to add credits based on one or more certificates in his possession. When the certificate number is entered (1900) a format check occurs (1910) to ensure the validity of the input data. If the format is okay (1910-Y), a check is made to see if the certificate has been previously used (1920). If the certificate is unused (1920-Y), the certificate entry in the certificate database is marked to indicate the certificate has now been used and the number of credits associated with that certificate number in the certificate database is added to the participant's record in the participant database (1940) and the process returns. If the certificate has been used (1920-N) a used certificate error message is generated and presented to the participant (1930).

Figure 20:
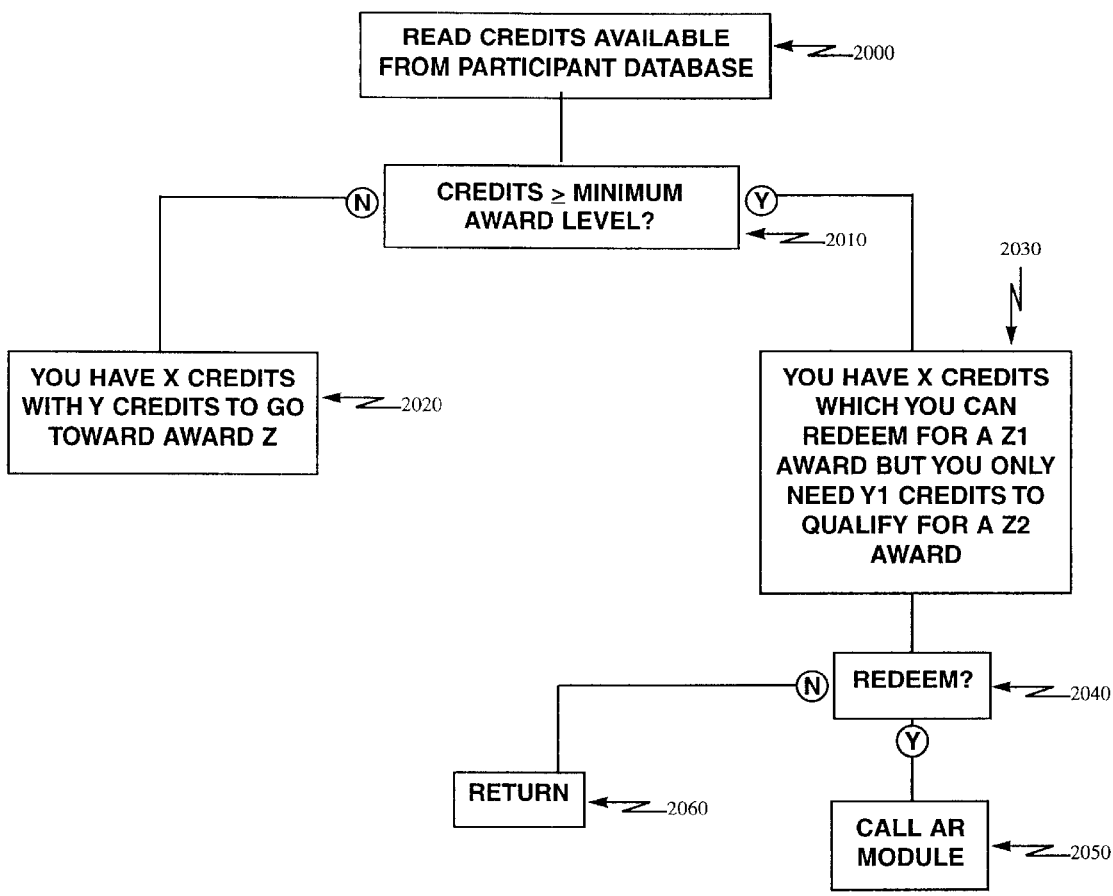
FIG. 20 is a flow chart of an exemplary speak balance (SB) module in accordance with invention.

FIG. 20 is a flow chart of an exemplary speak balance (SB) module in accordance with the invention. When this module is entered, the number of credits available to the calling participant is read from a participant's record in a participant database (2000). When the credits available do not exceed the minimum award level (2010-N), this response announces that the participant has X credits with Y credits to go toward award Z. In this case, the award Z would be the minimum award as shown in the award table of FIG. 5. The value X for the X credits comes from the credits available in the participant database and the variable Y is calculated as the difference between the award level required credits and the credits available, X.

If the number of credits exceeds the minimum award level (2010-Y), the announcement changes to reflect that shown in block 2030. An announcement states that the participant has X credits which he can redeem for a Z1 award, if the participant desires. The Z1 award will be the highest level award for which the credits available, X, qualifies. The system will hold out the possibility of the Z2 award which it identifies in the announcement and will give a value of the number of credits, Y1, needed to qualify for the C2 award.

If the participant desires to redeem (2040-Y), the AR module is called (2050). Otherwise (2040-N), the process returns (2060).

Figure 21:
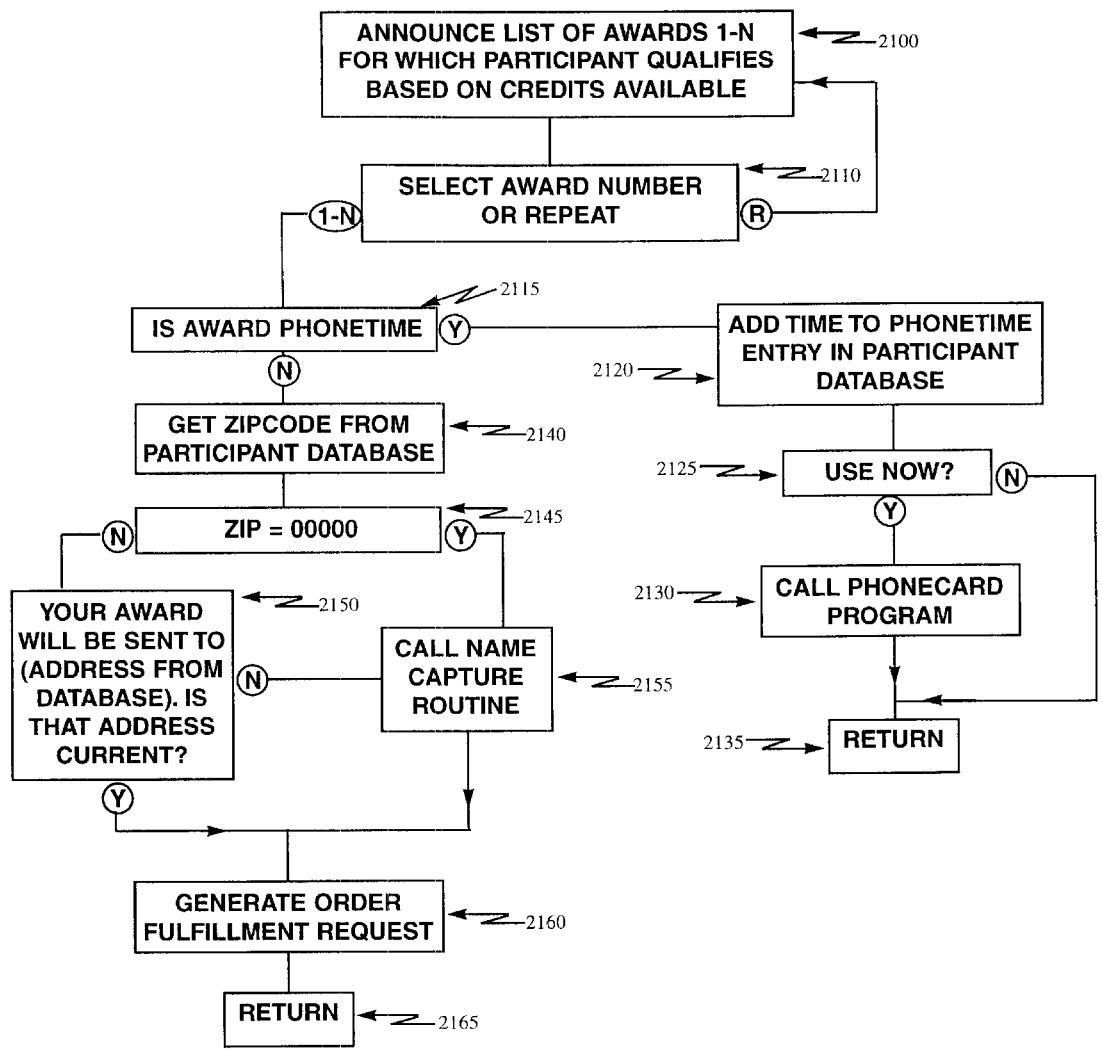
FIG. 21 is a flow chart of an exemplary award redemption (AR) module in accordance with the invention.

FIG. 21 is a flow chart of an exemplary award redemption (AR) module in accordance with the invention. In entering this module, the participant receives an announcement which lists the awards for which the participant qualifies based on the credits available (2100). The participant has an option to select an award or to repeat the announcement of the list (2110). If a repeat is requested (2110-R), the announcement is repeated (2100). If an award is selected (2110-1-N), a check is made to determine if the award selected is a phone time award (2115). If the award is phone time (2115-Y), an amount of time equivalent to the award selected is added to the phone entry in the participant database (2120). The user is offered an option to use the time immediately (2125), and if the user chooses to use the phone time (2125-Y), the phone card program is called (2130). Otherwise, (2125-N) the process returns.

If the award is not phone time (2115-N), the zip code will be retrieved from the address portion of the participant database. If the zip code is all zeros (2145-Y), a name capture routine will be called (2155) to capture the address information for the participant in order to mail the award to the participant. If the zip code is not all zeros, an address has been previously recorded in the participant database. The contents of the address record will be repeated back to the participant to ensure that the address is current. If it is (2150-Y), an order fulfillment request will be generated automatically (2160) and the process returns. The name capture routine is discussed more hereinafter in conjunction with FIGS. 25A and 25B.

Figure 22:
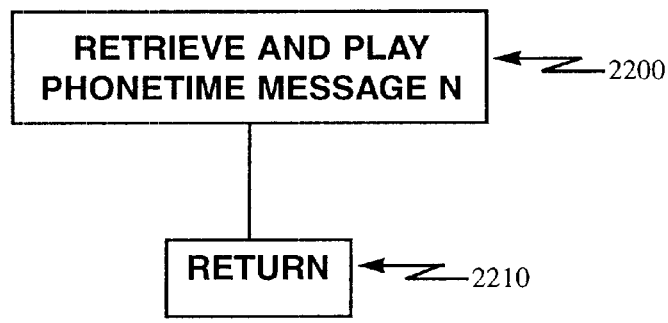
FIG. 22 is a flow chart of a promotional message (N)(n)) module in accordance with the invention.

FIG. 22 is a flow chart of an exemplary promotional message (M(n)) module in accordance with the invention. A plurality of different promotional messages are specified by the index n, the appropriate message specified by that index is retrieved and played for the participant (2200) and the process returns.

Figure 23:
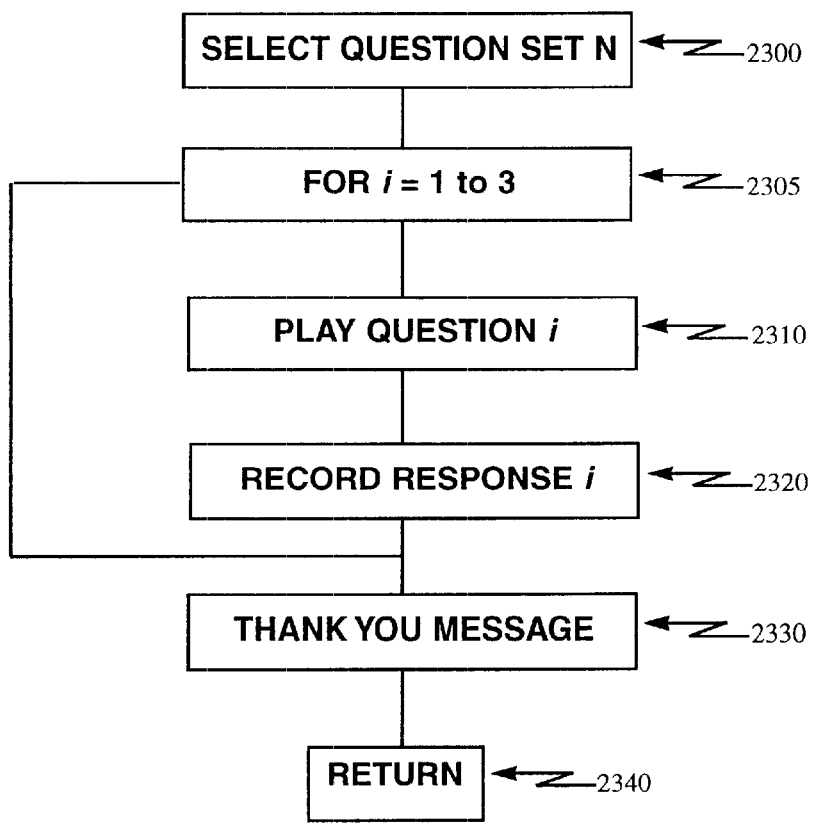
FIG. 23 is a flow chart of an exemplary polling (P)(n)) module in accordance with the invention.

FIG. 23 is a flow chart of an exemplary polling (P(n)) module in accordance with the invention. A typical polling sequence contains a limited number of questions. In the example shown, the number of questions is 3. The particular question set is specified by the index n, and when selected (2300), the questions are posed one at a time as indicated by the do loop (2305, 2310 and 2320). The questions are designed to permit a dialed response which will be correlated with the particular question posed to the user. At the end of the three questions, a "Thank you" message (2330) is played and the process returns.

Figure 24:
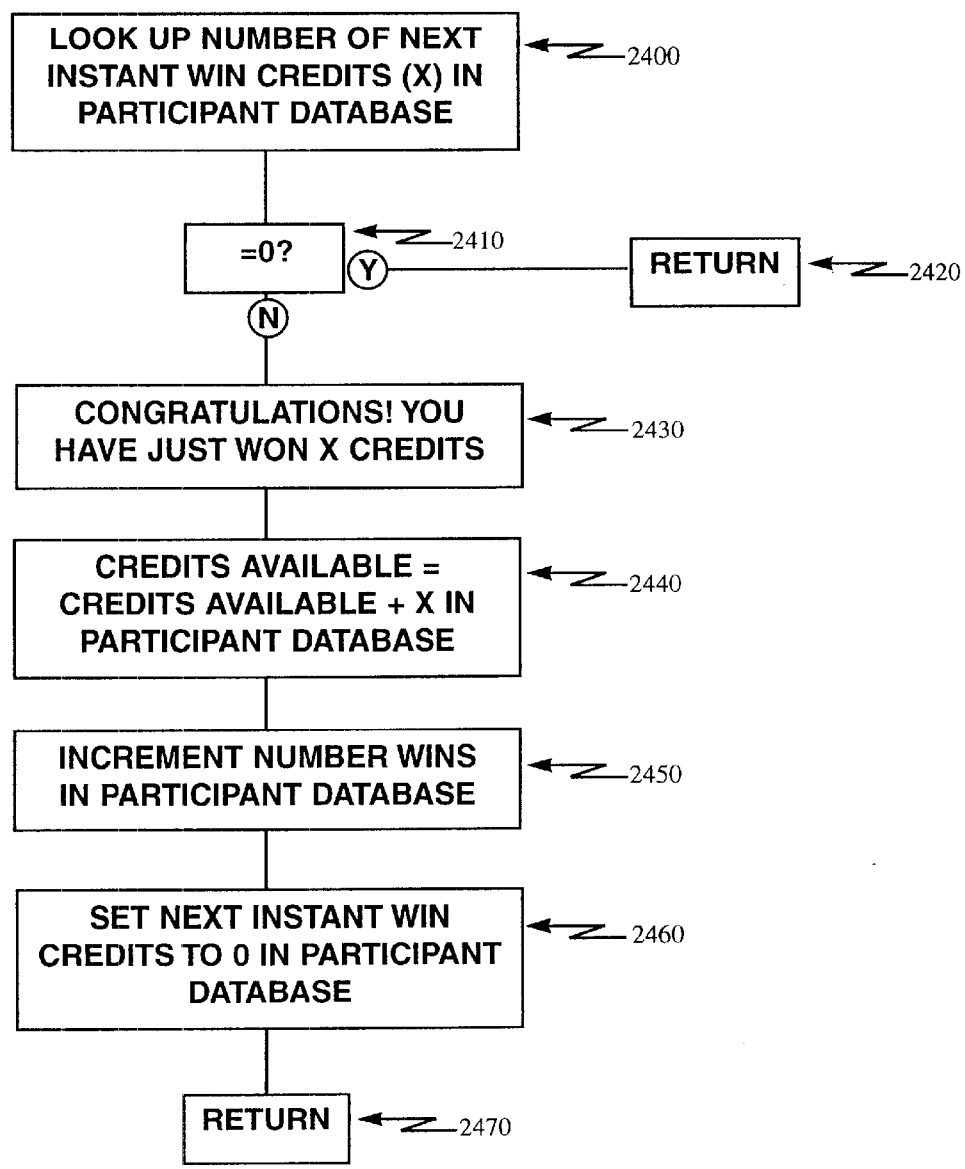
FIG. 24 is a flow chart of an exemplary instant win (IW) module in accordance with the invention.

FIG. 24 is a flow chart of an exemplary instant win (IW) module in accordance with the invention. When this module is entered, the participant's record in the participant database is utilized to look up the number of next instant win credits X(1300). If that number is zero (2410-Y), the process returns. If it is not zero (2410-Y) the participant is informed that the participant has been awarded X credits (2430) and the credits available have been increased in the participant database by that amount. The number of wins for the participant is also incremented in a participant database (2450) and the number of next instant win credits is set to zero in the participant database (2460). The process then returns.

Figure 25A:
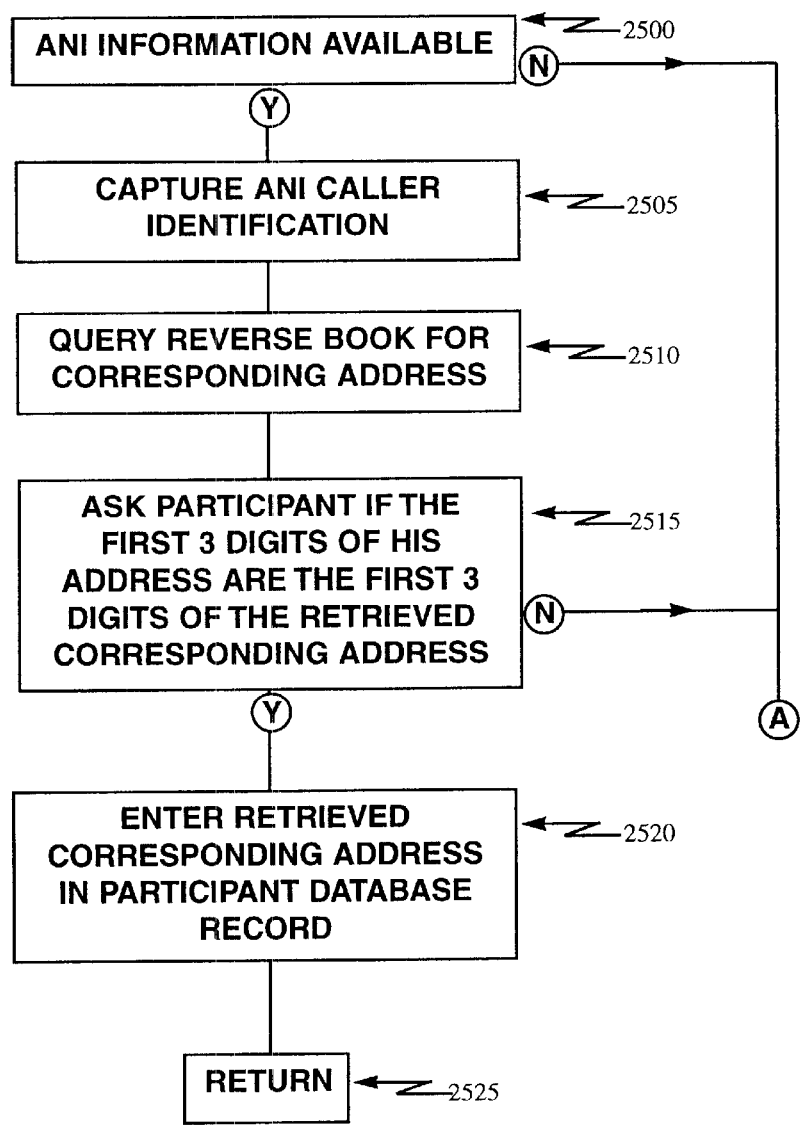
FIGS. 25A and 25B are flow charts of an exemplary name capture (NC) module in accordance with the invention.
Figure 25B:
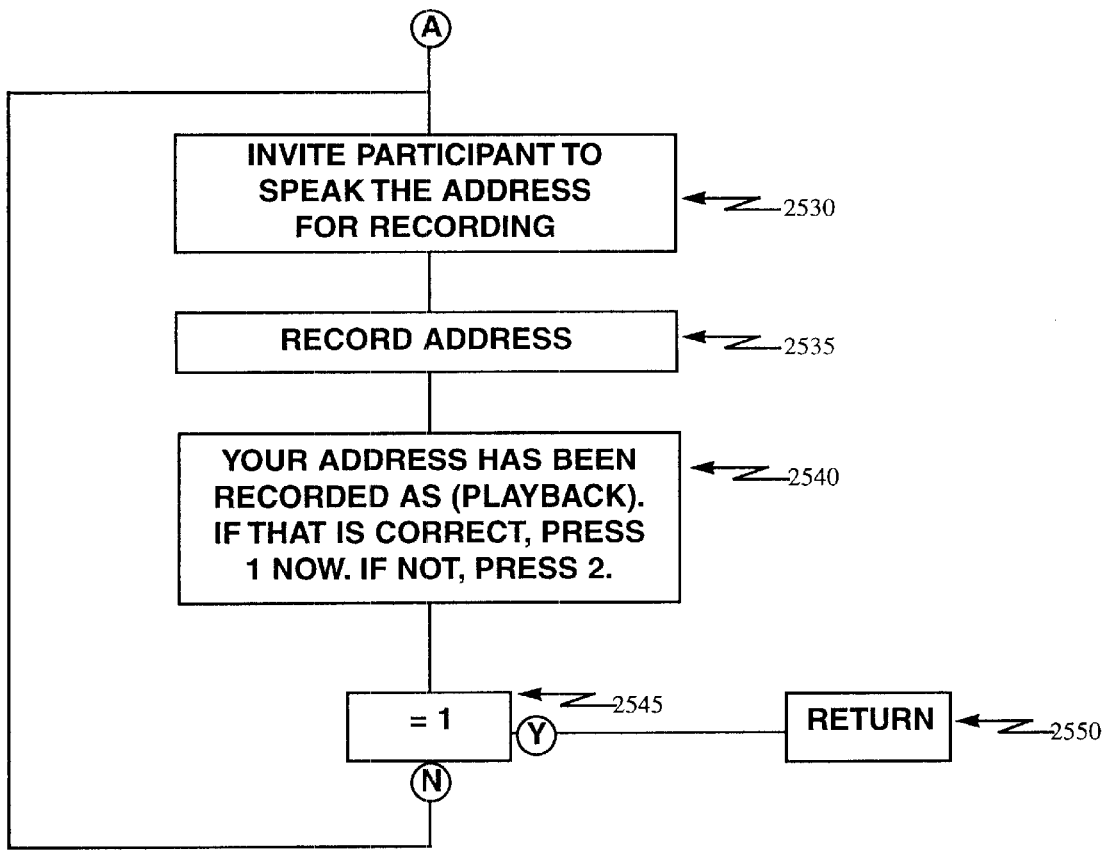

FIGS. 25A and 25B is a flow chart of an exemplary name capture (NC) module in accordance with the invention.

If automatic number identification information is available from the central office for the incoming call (2500-Y), that identification information is captured (2505) and utilized as a query to access a reverse database for the corresponding address (2510). On line services provide access to address information from a corresponding telephone number query. For example, the well known Haines Directory has an ongoing service which permits this kind of information to be accessed. Other commercial services also provide access to this type of information. If the address information is available in response to the query, the voice response unit queries the participant to determine whether the first few digits of the stored participant's address or the first few digits of the address retrieved from the reverse book service (2550) correctly reflect the current address. If they do (2550-Y), the retrieved current address is entered in a participant database record for the participant (2520) and the process returns (2520). If ANI information is not available (2500-N) or if the reverse book corresponding address information does not match (2515-N), the calling participant is invited to speak the correct address so that the information may be recorded (2530). Information is recorded (2535) and played back to the participant with the request that the participant confirm the accuracy of the recorded information (2540). If it is accurate (2540-Y), the process returns (2550) whereas if it is not (2545-N), the process loops back to item 2530 where an attempt will again be made to record the address.

Once the address has been recorded correctly, it will be entered into the participant database manually by an operator transcribing the recorded information. Whether captured automatically, or recorded manually, the entered address information will be utilized to automatically generate an order fulfillment from an order center either run by the company providing the incentive award system described herein or by a company under contract.

Figure 26:
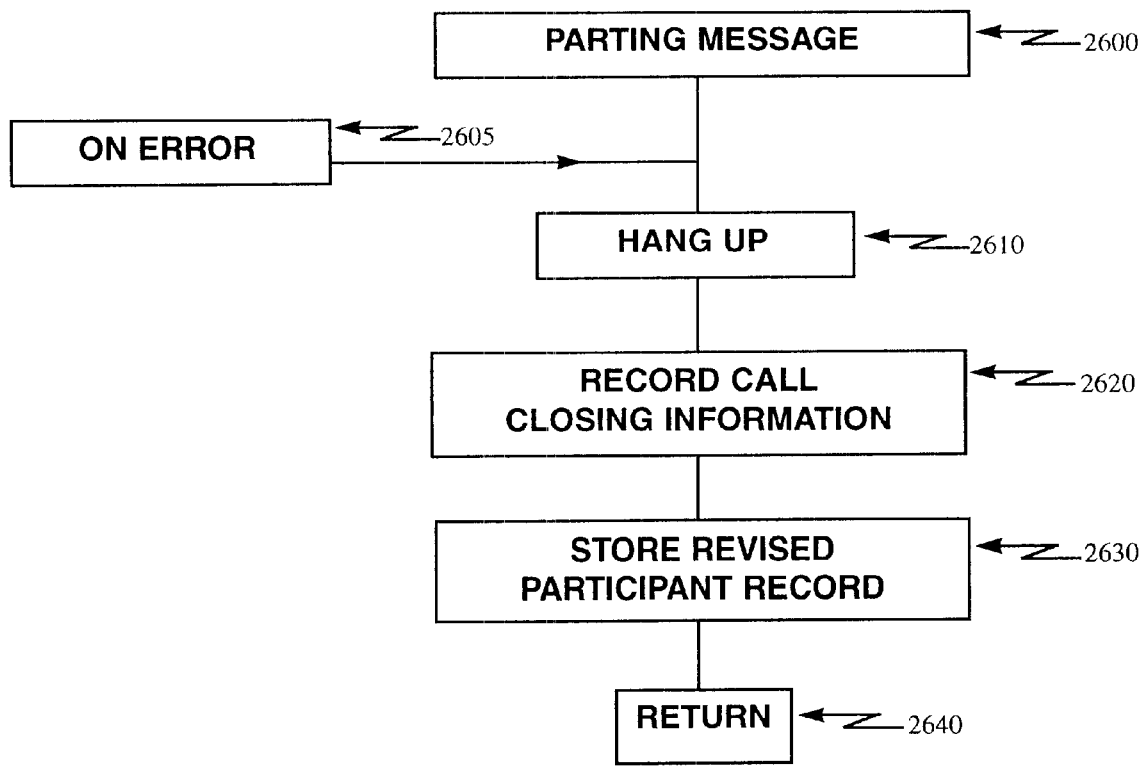
FIG. 26 is a flow chart of an exemplary good-bye (GB) module in accordance with the invention.

FIG. 26 is a flow chart of an exemplary good bye (GB) module in accordance with the invention. A parting message (2600) is played for the participant, the call incoming from the participant is terminated (2610), called terminating information is recorded in the participant record (2620), the revised participant record is stored in the participant database (2630) and the process returns.

The example just discussed illustrates how the interactive platform can be used in a particular network environment to conduct an incentive awards program.

Figure 27:
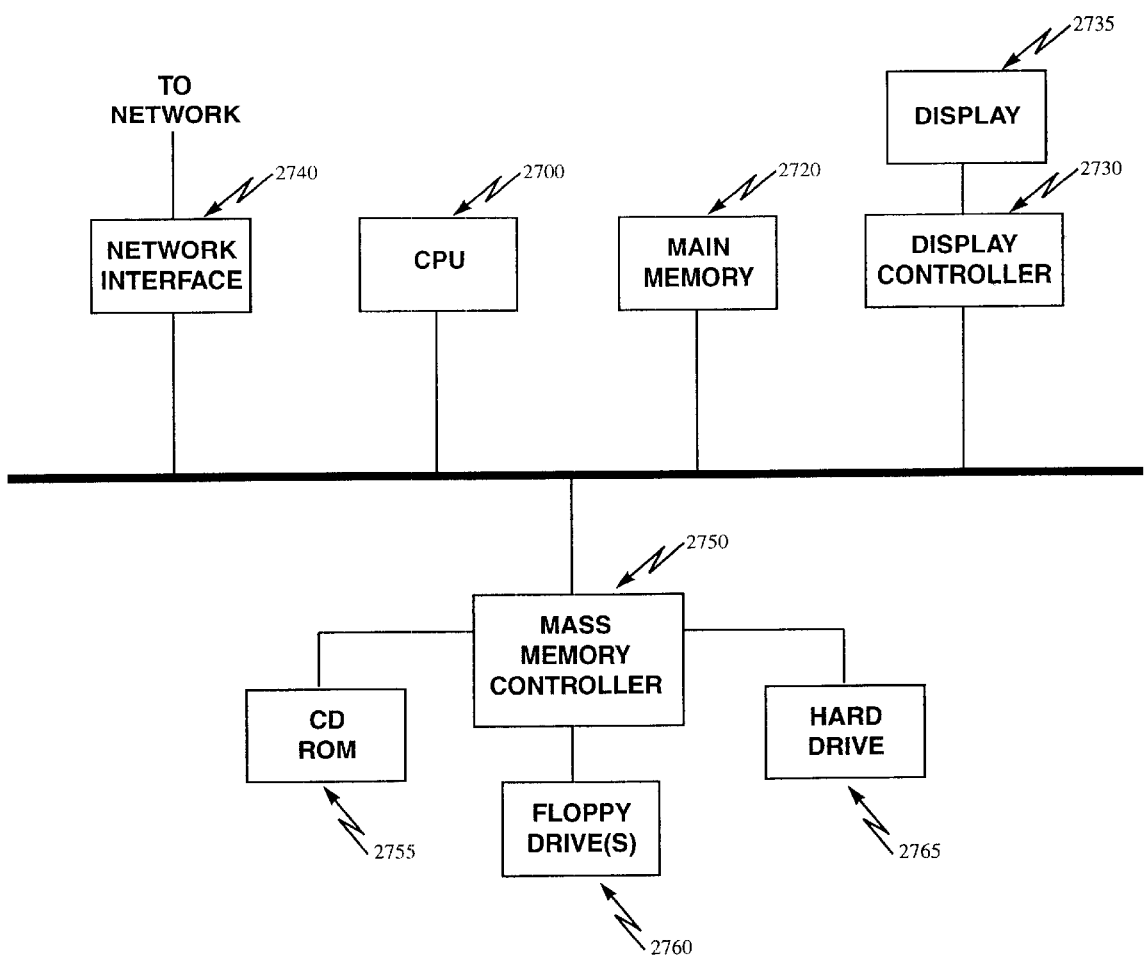
FIG. 27 is a block diagram of an exemplary computer architecture of a terminal 140 shown in FIG. 2.
Figure 28:
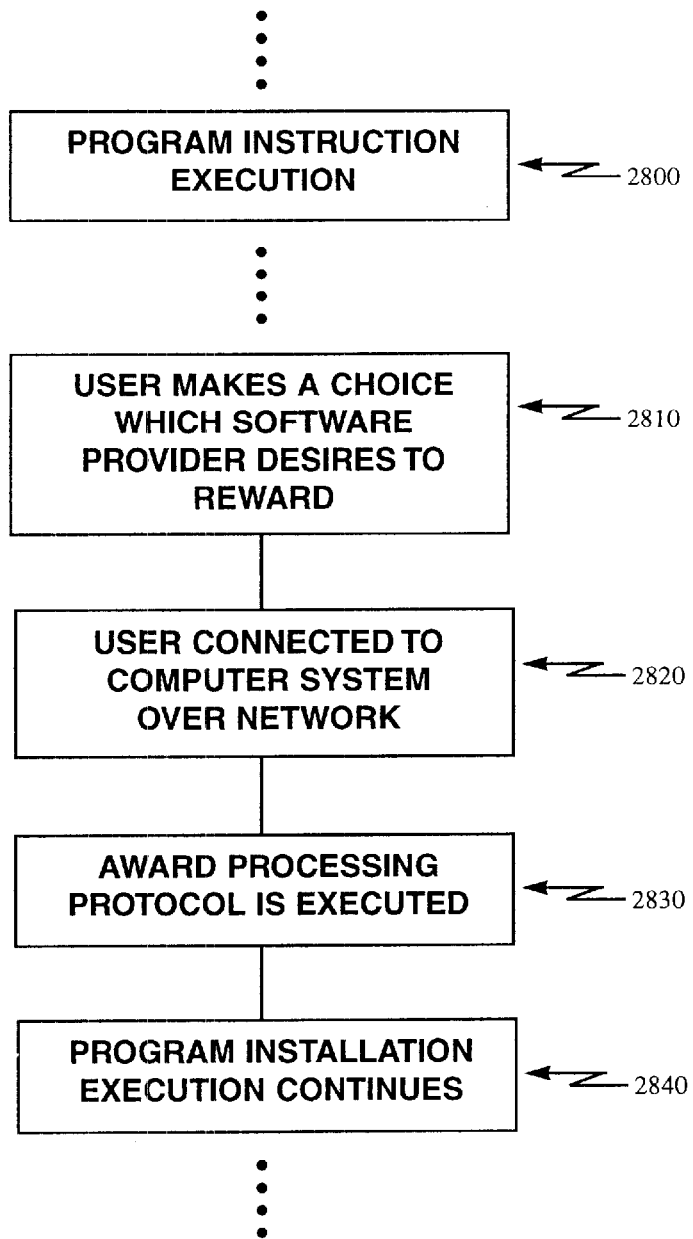
FIG. 28 is a flow chart of how an awards interaction in accordance with the invention can be initiated during execution of another program, such as one running using a CD ROM.

FIGS. 27 and 28 illustrate how an awards program can be incorporated into other types of computer activity such as the running of a program or process.

FIG. 27 is a block diagram of an exemplary computer architecture of a computer terminal shown in FIG. 2. A computer terminal suitable for interaction with the interactive platform of the invention includes a CPU 2700 connected to a bus 2710. The computer includes a main memory 2720, a display controller 2730 with accompanying display 2735. A memory controller 2750 interfaces a plurality of storage devices such as CD ROM 2755, floppy drive(s) 2760 and hard drive 2765. A. network interface card 2740 permits access to a network for the terminal device.

FIG. 28 is a flow chart of how an awards interaction in accordance with the invention can be invoked during execution of another program, such as one running using a CD ROM. Such an environment might occur when, for example, a computer user, using a terminal such as that shown in FIG. 27 is running an interactive game on the computer which interacts with content stored on, for example, a CD ROM. As program execution of the game instructions occurs (2800), a user may make a choice which the software provider desires to reward (2810). In the context of an interactive game, it may be that the game developer desires to reward users who achieve a certain level of proficiency with the game and, when a user makes a choice which raises his score above a threshold level, entitles the user to that reward. When that occurs, the user can be connected to the interactive platform 110 over the network (2820) where an award processing protocol will be executed (2830) such as ones described above. When the processing of the award information has been completed, program interactive execution continues (2840) and the user will have been rewarded for playing and/or purchasing the game.

It is clear that a CD ROM program need not necessarily be involved, and the program could involve a program stored on a floppy disk or other memory medium or a network downloaded program. Thus, by using an interactive platform in accordance with the invention, a variety of promotional programs may be administered conveniently, effectively, and in ways which overcome the problems of the prior art and which provide considerable advantages over that which has been done before.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A computer-implemented method of changing interaction with a caller who calls a telephone number as part of a promotional awards program, comprising the steps of:
   a. storing an indication of the number of times a caller has called; and
   b. selecting interactions based on said number including providing individualized polling queries directed to the caller to control presentation of information to the caller.

2. The method of claim 1 in which said interactions are selected using a call flow table.

3. The computer-implemented method of claim 1, wherein the call is placed to register a certificate awarded as part of the promotional awards program.

4. The computer-implemented method of claim 1, wherein the number is stored in a participant database including one or more of: a personal identification number, a telephone number, an indication of a total amount of accumulated credits in the promotional awards program, a date of first call, a date of most recent call, an address, an indication of free phone time, an indication of an amount of credits instantly winnable, and a number of wins.

5. The computer-implemented method of claim 1, further comprising retrieving participant information from a participant database for use in selecting the interactions.

6. The computer-implemented method of claim 1, further comprising playing, in response to said selecting step (b), the selected interactions.

7. The computer-implemented method of claim 1, wherein the interactions comprise one or more of a greeting/PIN module; a select menu module; a certificate number module; a speak balance module; an award redemption module; a promotional message module; a polling module; an instant win module; a name capture module; and a goodbye module.

8. The computer-implemented method of claim 7, wherein said greeting/PIN module comprises playing a greeting message and a request for a PIN, if one is not already in the database.

9. The computer-implemented method of claim 7, wherein said select menu module comprises placing a long distance phone call for the caller.

10. The computer-implemented method of claim 7, wherein said certificate number module comprises allowing the caller to add credits to an account.

11. The computer-implemented method of claim 7, wherein said speak balance module comprises playing a message indicating an amount of credits available to the caller.

12. The computer-implemented method of claim 7, wherein said award redemption module comprises listing awards available to the caller, and allowing the caller to optionally select and redeem one or more of the awards.

13. The computer-implemented method of claim 7, wherein said instant win module comprises awarding an instant win amount to the caller.

14. The computer-implemented method of claim 7, wherein said name capture module comprises collecting information from the caller.

15. The computer-implemented method of claim 7, wherein said name capture module comprises collecting information regarding the caller by accessing a reverse database through use of automatic number identification information from a central office.

16. The computer-implemented method of claim 7, further comprising activating one or more of said interactions.

17. The computer-implemented method of claim 1, wherein said selecting step (b) considers consumer information or promoter information in addition to the number of calls.

18. The computer-implemented method of claim 1, further comprising updating a participant database after each call.

19. The computer-implemented method of claim 1, wherein said presentation of information to the caller includes the presentation of predetermined products which the polling queries indicate the caller is likely to be interested in.

20. A computer-implemented method of changing interaction with a caller who calls a telephone number as part of a promotional awards program, comprising:
   a step for storing an indication of the number of times a caller has called; and
   a step for selecting interactions based on said number including providing individualized polling queries including information indicative of the caller's marketing preferences directed to the caller to control presentation of information to the caller using the promotional awards program to obtain the marketing preferences from the caller and to thereby obtain information regarding products or services the caller is likely to acquire.

21. The computer-implemented method of claim 20, wherein the call is placed to register a certificate awarded as part of the promotional awards program.

22. The computer-implemented method of claim 20, wherein the number is stored in a participant database including one or more of: a personal identification number, a telephone number, an indication of a total amount of accumulated credits in the promotional awards program, a date of first call, a date of most recent call, an address, an indication of free phone time, an indication of an amount of credits instantly winnable, and a number of wins.

23. The computer-implemented method of claim 20, further comprising a step for retrieving participant information from a participant database for use in selecting the interactions.

24. The computer-implemented method of claim 20, further comprising a step for playing, in response to said selecting step (b), the selected interactions.

25. The computer-implemented method of claim 20, wherein the interactions comprise one or more of a greeting/PIN module; a select menu module; a certificate number module; a speak balance module; an award redemption module; a promotional message module; a polling module; an instant win module; a name capture module; and a goodbye module.

26. The computer-implemented method of claim 25, wherein said select menu module comprises placing a long distance phone call for the caller.

27. The computer-implemented method of claim 25, wherein said certificate number module comprises allowing the caller to add credits to an account.

28. The computer-implemented method of claim 25, wherein said speak balance module comprises playing a message indicating an amount of credits available to the caller.

29. The computer-implemented method of claim 25, wherein said award redemption module comprises listing awards available to the caller, and allowing the caller to optionally select and redeem one or more of the awards.

30. The computer-implemented method of claim 25, wherein said instant win module comprises awarding an instant win amount to the caller.

31. The computer-implemented method of claim 20, wherein said step for selecting considers consumer information or promoter information in addition to the number of calls.

32. The computer-implemented method of claim 20, further comprising a step for updating a participant database after each call.

33. The computer-implemented method of claim 20, wherein said presentation of information to the caller includes the presentation of predetermined products which the polling queries indicate the caller is likely to be interested in.

34. A computer system for changing interaction with a caller who calls a telephone number as part of a promotional awards program, comprising:
   a processor;
   a memory medium accessible by said processor containing instructions for controlling said processor, said instructions causing said processor to effect storing an indication of the number of times a caller has called; and selecting interactions based on said number including providing individualized polling queries including information indicative of the caller's marketing preferences directed to the caller to control presentation of information to the caller using the promotional awards program to obtain the marketing preferences from the caller and to thereby obtain information regarding products or services the caller is likely to acquire.

35. The computer system of claim 34, wherein the call is placed to register a certificate awarded as part of the promotional awards program.

36. The computer system of claim 34, wherein the number is stored in a participant database including one or more of: a personal identification number, a telephone number, an indication of a total amount of accumulated credits in the promotional awards program, a date of first call, a date of most recent call, an address, an indication of free phone time, an indication of an amount of credits instantly winnable, and a number of wins.

37. The computer system of claim 34, further comprising instructions for retrieving participant information from a participant database for use in selecting the interactions.

38. The computer system of claim 34, further comprising instructions for playing, in response to said selecting, the selected interactions.

39. The computer system of claim 34, wherein the interactions comprise one or more of a greeting/PIN module; a select menu module; a certificate number module; a speak balance module; an award redemption module; a promotional message module; a polling module; an instant win module; a name capture module; and a goodbye module.

40. The computer system of claim 39, wherein said greeting/PIN module comprises playing a greeting message and a request for a PIN, if one is not already in the database.

41. The computer system of claim 39, wherein said select menu module comprises placing a long distance phone call for the caller.

42. The computer system of claim 39, wherein said certificate number module comprises allowing the caller to add credits to an account.

43. The computer system of claim 39, wherein said speak balance module comprises playing a message indicating an amount of credits available to the caller.

44. The computer system of claim 39, wherein said award redemption module comprises listing awards available to the caller, and allowing the caller to optionally select and redeem one or more of the awards.

45. The computer system of claim 39, wherein said instant win module comprises awarding an instant win amount to the caller.

46. The computer system of claim 39, wherein said name capture module comprises collecting information from the caller.

47. The computer system of claim 39, wherein said name capture module comprises collecting information regarding the caller by accessing a reverse database through use of automatic number identification information from a central office.

48. The computer system of claim 39, further comprising instructions for activating one or more of said interactions.

49. The computer system of claim 34, wherein said selecting considers consumer information or promoter information in addition to the number of calls.

50. The computer system of claim 34, further comprising instructions for updating a participant database after each call.

51. The computer system of claim 34, wherein said presentation of information to the caller includes the presentation of predetermined products which the polling queries indicate the caller is likely to be interested in.

52. A system for changing interaction with a caller who calls a telephone number as part of a promotional awards program, comprising:
   means for storing an indication of the number of times a caller has called; and
   means for selecting interactions based on said number including providing individualized polling queries including information indicative of the caller's marketing preferences directed to the caller to control presentation of information to the caller using the promotional awards program to obtain the marketing preferences from the caller and to thereby obtain information regarding products or services the caller is likely to acquire.

53. The system of claim 52, wherein the call is placed to register a certificate awarded as part of the promotional awards program.

54. The system of claim 52, wherein the number is stored in a participant database including one or more of: a personal identification number, a telephone number, an indication of a total amount of accumulated credits in the promotional awards program, a date of first call, a date of most recent call, an address, an indication of free phone time, an indication of an amount of credits instantly winnable, and a number of wins.

55. The system of claim 52, further comprising means for retrieving participant information from a participant database for use in selecting the interactions.

56. The system of claim 52, further comprising means for playing, in response to the selected interactions.

57. The system of claim 52, wherein the interactions comprise one or more of a greeting/PIN module; a select menu module; a certificate number module; a speak balance module; an award redemption module; a promotional message module; a polling module; an instant win module; a name capture module; and a goodbye module.

58. The system of claim 57, wherein said greeting/PIN module comprises playing a greeting message and a request for a PIN, if one is not already in the database.

59. The system of claim 57, wherein said select menu module comprises placing a long distance phone call for the caller.

60. The system of claim 57, wherein said certificate number module comprises allowing the caller to add credits to an account.

61. The system claim 57, wherein said speak balance module comprises playing a message indicating an amount of credits available to the caller.

62. The system of claim 57, wherein said award redemption module comprises listing awards available to the caller, and allowing the caller to optionally select and redeem one or more of the awards.

63. The system of claim 57, wherein said instant win module comprises awarding an instant win amount to the caller.

64. The system of claim 52, wherein said means for selecting considers consumer information or promoter information in addition to the number of calls.

65. The system of claim 52, further comprising means for updating a participant database after each call.

66. The system of claim 52, wherein said presentation of information to the caller includes the presentation of predetermined products which the polling queries indicate the caller is likely to be interested in.

67. A computer-implemented method of changing interaction with a participant who transmits a communication as part of a promotional awards program, comprising the steps of:

storing an indication of the number of times the participant has transmitted a communication;

selecting interactions based on said number indicative, in part, to the participant's interest in the promotional awards program, and said selecting including providing individualized polling queries including information indicative of the participant's marketing preferences directed to the participant to control presentation of information to the participant using the promotional awards program to obtain the marketing preferences from the participant and to thereby obtain information regarding products or services the participant is likely to acquire; and awarding award credits or instant prizes in response to the participant's interactions with said individualized polling queries.

68. The computer-implemented method of claim 67, wherein interactions selected in response to a first communication include at least a name capture module, and wherein interactions selected in response to subsequent communications do not include said name capture module.

69. The computer-implemented method of claim 67, wherein the interactions comprise a certificate number module; an award redemption module; a promotional message module; a polling module; and an instant win module.

70. The computer-implemented method of claim 1, wherein the interactions comprise a certificate number module; an award redemption module; a promotional message module; a polling module; and an instant win module.

71. The system of claim 34, wherein the interactions comprise a certificate number module; an award redemption module; a promotional message module; a polling module; and an instant win module.

72. A computer-implemented method of changing interaction with a participant who communicates with a promotional awards program system, comprising the steps of:

receiving a communication from the participant;

obtaining information on the participant to become eligible to participate in the promotional awards program;

receiving additional communications from the participant;

determining a number of times the participant has communicated with the promotional awards program system with respect to the additional communications;

storing an indication of the number of times the participant has communicated; and selecting interactions with the participant based on said number indicative in part to the participant's interest in the promotional awards program, and said selecting step further including providing individualized polling queries including information indicative of the participant's marketing preferences and controlling presentation of information to the participant using the promotional awards program to obtain the marketing preferences from the participant and to thereby obtain information regarding products or services the participant is likely to acquire.

73. A computer-implemented method of changing interaction with a participant who communicates with a promotional awards program system over a computer network, comprising the steps of:

receiving a communication from the participant over the computer network;

obtaining information on the participant to become eligible to participate in the promotional awards program over the computer network;

receiving additional communications from the participant over the computer network;

determining a number of times the participant has communicated with the promotional awards program system with respect to the additional communications;

storing an indication of the number of times the participant has communicated; and selecting interactions with the participant based on said number indicative in part to the participant's interest in the promotional awards program, and said selecting step further including providing individualized polling queries over the computer network to the participant including information indicative of the participant's marketing preferences and controlling presentation of information to the participant using the promotional awards program to obtain the marketing preferences from the participant and to thereby obtain information regarding products or services the participant is likely to acquire.

* * * * *